US012809882B2

(12) United States Patent
Bishop et al.

(10) Patent No.: US 12,809,882 B2
(45) Date of Patent: Nov. 24, 2026

(54) RECURSIVE HASHING FOR DETECTING CHANGES IN STRUCTURED DATA RECORDS

(71) Applicant: Optum, Inc., Minnetonka, MN (US)

(72) Inventors: William Harmon Bishop, Raleigh, NC (US); Kristen A. McGinley, Phoenixville, PA (US)

(73) Assignee: Optum, Inc., Minnetonka, MN (US)

( * ) Notice: Subject to any disclaimer, the term of this patent is extended or adjusted under 35 U.S.C. 154(b) by 0 days.

(21) Appl. No.: 19/007,008

(22) Filed: Dec. 31, 2024

(65) Prior Publication Data

US 2026/0187093 A1 Jul. 2, 2026

(51) Int. Cl.

*G06F 16/25* (2019.01)
*G06F 16/22* (2019.01)
*G06F 16/901* (2019.01)

(52) U.S. Cl.

CPC ........ *G06F 16/254* (2019.01); *G06F 16/2255* (2019.01); *G06F 16/9024* (2019.01)

(58) Field of Classification Search

None

See application file for complete search history.

(56) References Cited

U.S. PATENT DOCUMENTS 7,908,254 B2 3/2011 Suermondt et al.
7,912,842 B1 3/2011 Bayliss
9,805,081 B2 10/2017 Scott et al.
10,096,381 B1 10/2018 McNair
11,074,294 B2 7/2021 Natarajan
11,416,523 B2 8/2022 Tamayo-Rios et al.
11,514,020 B2 * 11/2022 Froese .................. G06F 16/273
11,694,276 B1 7/2023 Gil et al.
12,050,572 B1 7/2024 Ambrose et al.
12,062,420 B2 8/2024 Mcnair et al.
2013/0191350 A1 * 7/2013 Esaka ................. G06F 16/1748 707/E17.005
2018/0095941 A1 * 4/2018 Ciabarra, Jr. ......... G06F 40/143

(Continued)

FOREIGN PATENT DOCUMENTS

WO 2016/043757 A1 3/2016

OTHER PUBLICATIONS

Helbling, "Directed Graph Hashtag", (20 pages), Jun. 19, 2023, arXiv:2002.06653v3.

(Continued)

*Primary Examiner* — Richard L Bowen
(74) *Attorney, Agent, or Firm* — Alston & Bird LLP

(57) ABSTRACT

Various embodiments of the present disclosure provide message ingestion interfaces that improves the functionality of a computer in various aspects. The techniques comprise receiving an incoming message that corresponds to stored record and comprises self-referencing data structures. The techniques comprise converting the incoming message to a message graph that maintains the self-referencing integrity of the incoming message, generating, using a hashing algorithm, an incoming message hash for the incoming message based on the message graph, detecting a record modification for the stored record based on a hash comparison between the incoming message hash and a recorded hash of the stored record, and storing a portion of the incoming message that corresponds to the record modification.

20 Claims, 10 Drawing Sheets

(56) References Cited

U.S. PATENT DOCUMENTS

| | | | | |
|---|---|---|---|---|
| 2019/0385078 | A1* | 12/2019 | Cui | G06N 20/00 |
| 2022/0121687 | A1 | 4/2022 | Tirupati et al. | |
| 2023/0027115 | A1 | 1/2023 | Pulipaty et al. | |
| 2023/0244697 | A1 | 8/2023 | Biswas | |
| 2023/0282337 | A1 | 9/2023 | Conjeti | |
| 2023/0334093 | A1* | 10/2023 | Garduno Hernandez | G06F 16/9024 |
| 2024/0411737 | A1 | 12/2024 | Sivaraj et al. | |
| 2024/0419653 | A1 | 12/2024 | Sivaraj et al. | |
| 2025/0077528 | A1 | 3/2025 | Habibabadi et al. | |

OTHER PUBLICATIONS

Aizpurua, B., et al., "Quantum Large Language Models via Tensor Network Disentanglers", submitted Oct. 22, 2024 to Cornell University Olin Online Library Archive, available on the Internet at https://arxiv.org/pdf/2410.17397, 4 pages.

Ali, M. Sanni, "Administrative Data Linkage in Brazil: Potentials for Health Technology Assessment", Frontiers in Pharmacology, Sep. 23, 2019, 20 pages, vol. 10, No. 984, retrieved from the Internet at https://www.frontiersin.org/journals/pharmacology/articles/10.3389/fphar.2019.00984/full on May 4, 2026.

Liao, Y., et al., "GPT on a Quantum Computer", submitted Mar. 14, 2024 to Cornell University Olin Library Online Archive, available on the Internet at https://arxiv.org/pdf/2403.09418, 35 pages.

Nelson, Walter, et al., "Optimizing Patient Record Linkage in a Master Patient Index Using Machine Learning: Algorithm Development and Validation", JMIR Formative Research, Jun. 29, 2023, vol. 7, No. e4431, retrieved from the Internet at https://pmc.ncbi.nlm.nih.gov/articles/PMC10365597/pdf/formative_v7i1e44331.pdf on May 4, 2026, 8 pages.

Pulicharla, Mohan Raja, "Hybrid Quantum-Classical Machine Learning Models: Powering the Future of AI", Journal of Science & Technology, Jan. 2023, pp. 40-65, vol. 4, No. 1, The Science Brigade Publishing Group, India.

Ryzhikov, Nikolai, et al., "Master Patient Index (MPI): How It Works + Examples", Health Samurai, Mar. 9, 2024, retrieved from the Internet at https://www.health-samurai.io/articles/master-patient-index-and-record-linkage on May 4, 2026, 12 pages.

U.S. Non-Provisional Patent Application for "System and Method for Cross-Domain Data Record Matching", Unpublished (Jul. 8, 2025), William Harmon Bishop (Inventor), Optum, Inc. (Applicant), 19262952.

Non-Final Rejection Mailed on Jun. 17, 2026 for U.S. Appl. No. 19/262,952, 10 page(s).

* cited by examiner

RECURSIVE HASHING FOR DETECTING CHANGES IN STRUCTURED DATA RECORDS

BACKGROUND

In data ingestion systems, data messages are received and ingested from different platform to provide a comprehensive and up-to-date record for a particular circumstance. Historically, when dealing with comprehensive records that aggregate data from a sequence of events, data ingestion systems have relied on comparison between entire cumulative data records (e.g., one received in a message and another existing record) to detect changes between a data message and a corresponding record. This leads to heavy processing burdens that scale with the size of records handled by the particular ingestion system. To reduce processing burdens, some ingestions systems implement extract, transform, and load (ETL) interfaces that identify changes to a record before ingesting a message into a data warehouse. However, traditional ETL interfaces are inefficient and prone to errors when dealing with complex, self-referencing data structures where identifiers may not remain consistent across transmissions. For example, traditional ETL interfaces struggle to maintain referential integrity when extracting only changed portions of a record, which inhibits the interfaces'ability to reliably detect changes within a message for data ingestion.

DETAILED DESCRIPTION

Figure 1:
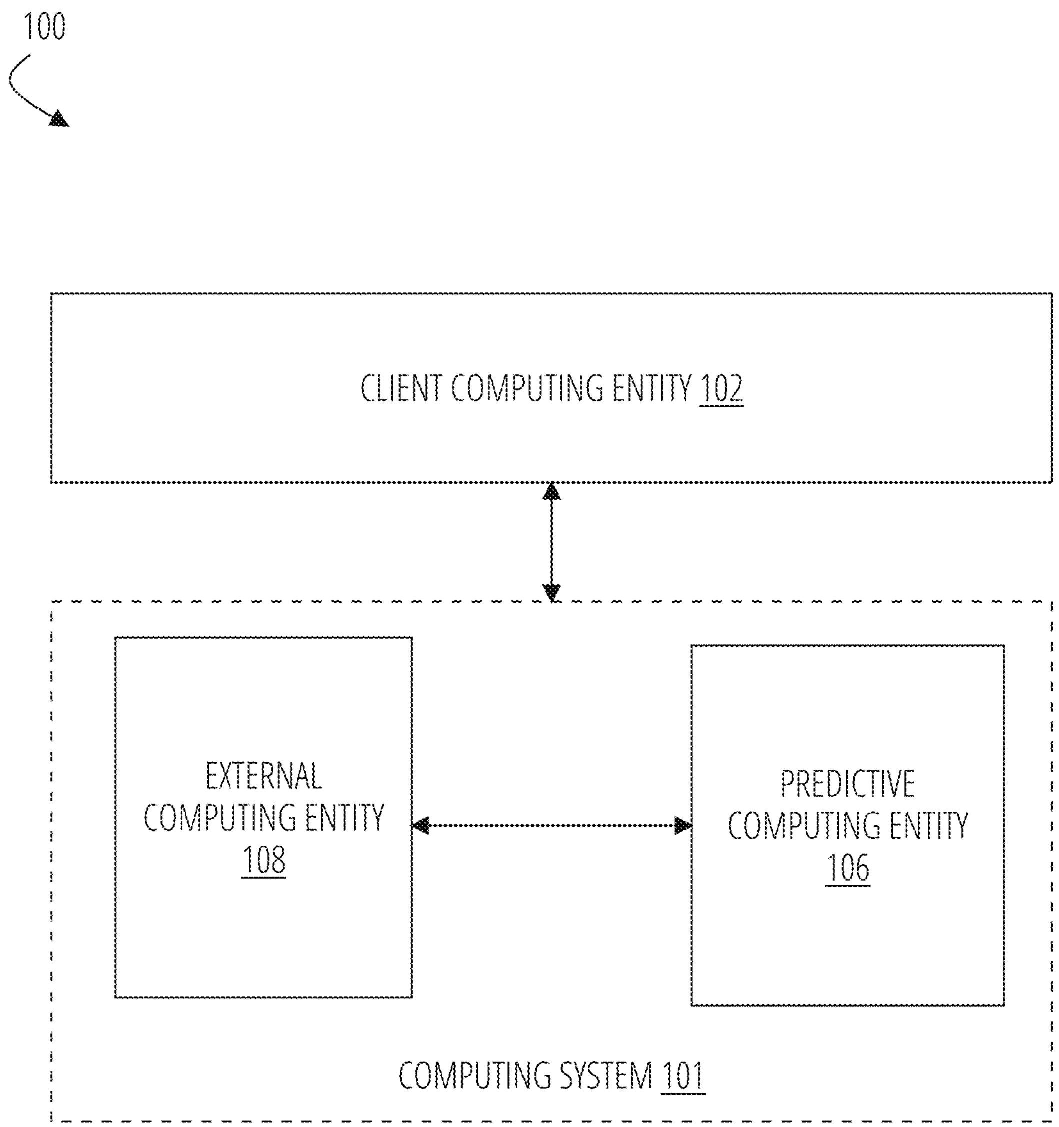
FIG. 1 depicts a block diagram of an example architecture in accordance with some embodiments of the present disclosure.

Various embodiments of the present disclosure provide improved ingestion interfaces, such as ETL interfaces, for ingesting structured, self-referencing data records for a data warehouse. The improved ingestion interfaces, for example, may implement a multi-stage ingestion process that integrates graph-based data manipulation techniques with recursive hash-based matching techniques to process self-referencing data structures in a speed effective manner, without comprising the referential data integrity of the data structures. The multi-stage ingestion process enables efficient processing (e.g., in terms of speed, accuracy, and processing expense) of structured data messages by converting them into graph representations that may serve as a basis for hash comparisons to detect modifications between incoming messages and stored records. This, in turn, reduces computational overhead and storage requirements when processing large volumes of self-referencing data. For instance, the multi-stage ingestion process may be implemented within an extraction stage of an ETL interface to enable real time extraction and processing of a portion of a cumulative incoming message, thereby reducing an amount of data processed by downstream process, such as the transformation and loading stages of the ETL interface. Ultimately, this leads to improved ingestion interfaces capable of filtering incoming messages formatted in complex, self-referencing data schemas that are outside to scope of traditional message filtering approaches.

In some embodiments of the present disclosure, the multi-stage ingestion process of the present disclosure comprises a series of operations implemented within a message interface to handle large file sizes, prevalent in cumulative data messages, in a time efficient manner that enables real-time processing in limited processing environments. To reduce processing requirements and increase ingestion speeds for any message size without reducing the accuracy of message ingestion, the multi-stage ingestion process implements an expanded extraction stage at which a portion of an incoming message that corresponds to a change between the incoming message and the stored record is detected using a hash-based matching technique and then extracted for further processing. By incorporating hash-based matching techniques of the present disclosure to an ingestion process, the multi-stage ingestion process may be implemented within a front-end interface to filter messages before the messages are passed to downstream processes, thereby reducing the processing expense of ingesting an incoming message in a manner that is agnostic to message size.

In some embodiments of the present disclosure, the multi-stage ingestion process of the present disclosure may tailor graph-based manipulation techniques to self-referencing data objects to convert the self-referencing data object to an intermediate data structure that may serve as a basis for hash-based matching. For instance, through a series of operations, the multi-stage ingestion process may convert a graph representation of an incoming message to a directed acyclic graph representation that allows for efficient traversal and processing of complex data structures with circular references, while avoiding infinite loops during hash generation. In some examples, the series of operations may integrate sorting approaches with the graph manipulation techniques to enable reproducible and reliable hash results that allow for hash comparisons between cumulative data messages and stored records of self-referencing data structures. This, in turn, provides a mechanism for incorporating hash-based matching within a message filtering interface that is capable of processing large file sizes of self-referencing data structures in a time efficient manner. By doing so, some of the techniques of the present disclosure improve data ingestion technology by addressing technical challenges associated with processing large volumes of structured data messages. The graph-based and hashing techniques, for example, provide improved ingestion interfaces that enable efficient detection of modifications within large, self-referencing data structures and reduce unnecessary processing of redundant data, thereby improving the overall performance and resource utilization of computer systems handling such data.

Examples of technologically advantageous embodiments of the present disclosure comprise improved graph manipulation techniques, hash-based matching techniques, message ingestion and filtering techniques, among other aspects of the present disclosure. Other technical improvements and advantages may be realized by one of ordinary skill in the art.

I. OVERVIEW OF EMBODIMENTS

As should be appreciated, various embodiments of the present disclosure may be implemented as methods, apparatus, systems, computing devices, computing entities, computer program products, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may take the form of an entirely hardware embodiment, an entirely computer program product embodiment, and/or an embodiment that comprises a combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments may produce specifically configured machines performing the steps or operations specified in the block diagrams and flowchart illustrations. Accordingly, the block diagrams and flowchart illustrations support various combinations of embodiments for performing the specified instructions, operations, or steps.

II. EXAMPLE FRAMEWORK

FIG. 1 depicts a block diagram of an example architecture 100 in accordance with some embodiments of the present disclosure. The architecture 100 comprises a computing system 101 configured to a request, such as an incoming message, and/or the like, from client computing entities 102, process the request, and provide the responses, such as record modifications, and/or the like, to the client computing entities 102. The example architecture 100 may be used in a plurality of domains and not limited to any specific application as disclosed herewith. The plurality of domains may comprise healthcare, industrial, manufacturing, computer security, and/or the like to name a few.

In some embodiments, the computing system 101 may communicate with at least one of the client computing entities 102 using one or more communication networks. Examples of communication networks comprise any wired or wireless communication network including, for example, a wired or wireless local area network (LAN), personal area network (PAN), metropolitan area network (MAN), wide area network (WAN), or the like, as well as any hardware, software, and/or firmware required to implement it (such as, e.g., network routers, and/or the like).

The computing system 101 may comprise a predictive computing entity 106 and one or more external computing entities 108. The predictive computing entity 106 and/or one or more external computing entities 108 may be individually and/or collectively configured to receive requests from client computing entities 102, process the requests to generate a code predictions, and provide the code predictions to the client computing entities 102.

For example, as discussed in further detail herein, the predictive computing entity 106 and/or one or more external computing entities 108 comprise storage subsystems that may be configured to store input data, training data, and/or the like that may be used by the respective computing entities to perform predictive data analysis and/or training operations of the present disclosure. In addition, the storage subsystems may be configured to store model definition data used by the respective computing entities to perform various predictive data processing and/or training tasks. The storage subsystem may comprise one or more storage units, such as multiple distributed storage units that are connected through a computer network. A storage unit in the respective computing entities may store at least one of one or more data assets and/or a set of data about the computed properties of one or more data assets. Moreover, each storage unit in the storage systems may comprise one or more non-volatile storage or volatile storage media similar to or different than the non-volatile and/or volatile computer-readable storage media discussed above.

In some embodiments, the predictive computing entity 106 and/or one or more external computing entities 108 are communicatively coupled using one or more wired and/or wireless communication techniques. The respective computing entities may be configured according to the techniques described herein to perform one or more operations of one or more techniques described herein. By way of example, the predictive computing entity 106 may be configured to train, implement, use (e.g., execute an inference operation(s)), update (e.g., fine-tune), and evaluate machine learning models in accordance with one or more training and/or inference operations of the present disclosure. In some examples, the external computing entities 108 may be configured to train, implement, use, update, and evaluate machine learning models in accordance with one or more training and/or inference operations of the present disclosure.

In some example embodiments, the predictive computing entity 106 may be configured to receive and/or transmit one or more datasets, objects, and/or the like from and/or to the external computing entities 108 to perform one or more steps/operations of one or more techniques (e.g., request handling, extraction, transformation, and loading techniques) described herein. The external computing entities 108, for example, may comprise and/or be associated with one or more entities that may be configured to receive, transmit, store, manage, and/or facilitate datasets, and/or the like. The external computing entities 108, for example, may comprise data sources that may provide such datasets, and/or the like to the predictive computing entity 106 which may leverage the datasets, such as stored record, data warehouses, and/or the like, to perform one or more steps/operations of the present disclosure, as described herein. In some examples, the datasets may comprise an aggregation of data from across a plurality of external computing entities 108 into one or more aggregated datasets. The external computing entities 108, for example, may be associated with one or more data repositories, cloud platforms, compute nodes, organizations, and/or the like, which may be individually and/or collectively leveraged by the predictive computing entity 106 to obtain and aggregate data for an information domain.

In some example embodiments, the predictive computing entity 106 may be configured to receive a trained machine learning model trained and subsequently provided by the one or more external computing entities 108. For example, the one or more external computing entities 108 may be configured to perform one or more training steps/operations of the present disclosure to train a machine learning model, as described herein. In such a case, the trained machine learning model may be provided to the predictive computing entity 106, which may leverage the trained machine learning model to perform one or more inference steps/operations of the present disclosure. In some examples, feedback (e.g., evaluation data, ground truth data) from the use of the machine learning model may be received and/or stored by the predictive computing entity 106. In some examples, the feedback may be provided to the one or more external computing entities 108 to continuously train the machine learning model over time. In some examples, the feedback may be leveraged by the predictive computing entity 106 to continuously train the machine learning model over time. In this manner, the computing system 101 may perform, via one or more combinations of computing entities, one or more prediction, training, and/or any other machine learning-based techniques of the present disclosure.

A. Example Computing Entity

Figure 2:
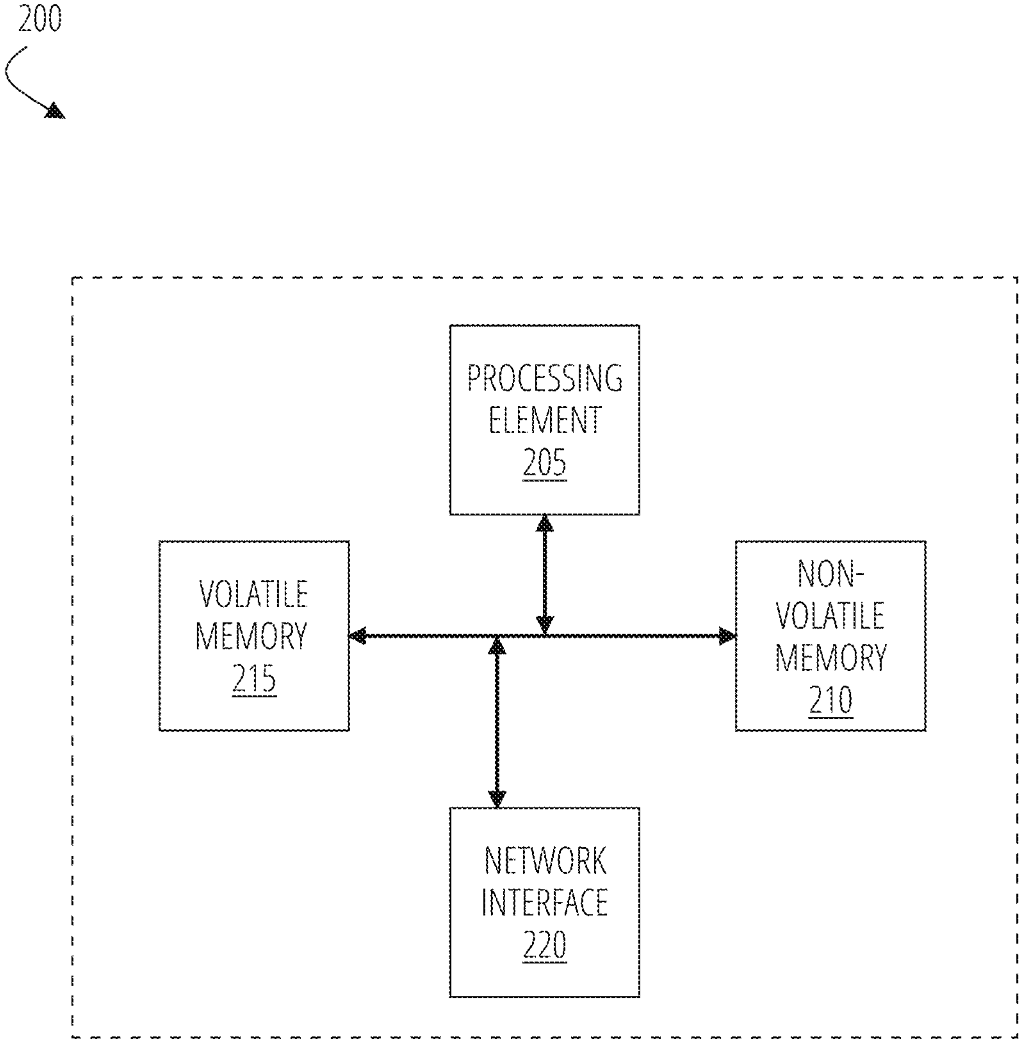
FIG. 2 depicts a block diagram of an example predictive data analysis computing entity in accordance with some embodiments of the present disclosure.

FIG. 2 depicts a block diagram of an example computing entity 200 in accordance with some embodiments of the present disclosure. The computing entity 200 is an example of the predictive computing entity 106 and/or external computing entities 108 of FIG. 1. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may comprise, for example, transmitting, receiving, operating on, processing, displaying, storing, determining, creating/generating, training one or more machine learning models, monitoring, evaluating, comparing, and/or similar terms used herein interchangeably. In some embodiments, these functions, operations, and/or processes may be performed on data, content, information, and/or similar terms used herein interchangeably. In some embodiments, the one computing entity (e.g., predictive computing entity 106) may train and use one or more machine learning models described herein. In other embodiments, a first computing entity (e.g., predictive computing entity 106, which may be one or more predictive computing entities) may use one or more machine learning models that may be trained by a second computing entity (e.g., external computing entity 108) communicatively coupled to the first computing entity. The second computing entity, for example, may train one or more of the machine learning models described herein, and subsequently provide the trained machine learning model(s) (e.g., optimized weights, code sets) to the first computing entity over a network.

As shown in FIG. 2, in some embodiments, the computing entity 200 may comprise, or be in communication with, one or more processing elements 205 (also referred to as processors, processing circuitry, and/or similar terms used herein interchangeably) that communicate with other elements within the computing entity 200 via a bus, for example. As will be understood, the processing element 205 may be embodied in a number of different ways.

For example, the processing element 205 may be embodied as one or more complex programmable logic devices (CPLDs), microprocessors, multi-core processors, arithmetic logic units (ALUs) (e.g., which may be part of one or more graphics processing units (GPUs), tensor processing units (TPUs), and/or the like), coprocessing entities, application-specific instruction-set processors (ASIPs), microcontrollers, and/or controllers. Additionally, or alternatively, the processing element 205 may be embodied as one or more other processing devices and/or circuitry. The term circuitry may refer to an entirely hardware embodiment or a combination of hardware and computer program products. Examples of a combination of hardware and computer program products comprise application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In some embodiments, the computing entity 200 may further comprise, or be in communication with, non-transitory computer readable media, such as non-volatile memory 210 (also referred to as non-volatile media, storage, memory storage, memory circuitry, and/or similar terms used herein interchangeably) and/or volatile memory 215 (also referred to as volatile media, storage, memory storage, memory circuitry, and/or similar terms used herein interchangeably), as discussed above.

In some embodiments, non-volatile memory 210 may comprise a computer-readable storage medium may comprise a floppy disk, flexible disk, hard disk, solid-state storage (SSS) (e.g., a solid-state drive (SSD), solid-state card (SSC), solid-state module (SSM)), enterprise flash drive, magnetic tape, or any other non-transitory magnetic medium, and/or the like. A non-volatile computer-readable storage medium may also comprise a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also comprise read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also comprise conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In some embodiments, volatile memory 215 may comprise a computer-readable storage medium including random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As will be recognized, the non-volatile memory 210 and/or the volatile memory 215 may store respective part(s) of one or more databases, database instances, database management systems, data, applications, programs, program modules, scripts, code (e.g., source code, object code, byte code, compiled code, interpreted code, machine code) that embodies one or more machine learning models or other computer functions described herein, executable instructions, and/or the like being executed by, for example, the processing element 205. The term database, database instance, database management system, and/or similar terms used herein interchangeably, may refer to a collection of records or data that is stored in a computer-readable storage medium using one or more database models; such as a hierarchical database model, network model, relational model, entity-relationship model, object model, document model, semantic model, graph model, and/or the like.

Thus, the databases, database instances, database management systems, data, applications, programs, program modules, code (source code, object code, byte code, compiled code, interpreted code, machine code) that embodies one or more machine learning models or other computer functions described herein, executable instructions, and/or the like may be used to control certain aspects of the operation of the computing entity 200 by operating the processing element 205 according to software component(s) retrieved from any of the computer-readable storage media and executed by the processing element 205.

Embodiments of the present disclosure may be implemented in various ways, including as computer program products that comprise articles of manufacture. Such computer program products may comprise one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages comprise, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form, such as object code, or may be first transformed into another form, such as by compiling source code. A software component may be stored as a file or other data storage construct. Software components of a similar type or functionally related may be stored together such as, for example, in a particular directory, folder, or library. Software components may be static (e.g., pre-established, or fixed) or dynamic (e.g., created or modified at the time of execution).

A computer program product may comprise a non-transitory computer-readable storage medium storing one or more software components comprising application(s), program(s), program module(s), script(s), source code and/or compiler(s) for generating executable instructions such as object code using the source code, program code, object code, byte code, compiled code, interpreted code, machine code, executable instructions, and/or the like (e.g., executable instructions, instructions for execution, computer program products, program code, and/or similar terms used herein interchangeably). Such non-transitory computer-readable storage media comprise all computer-readable storage media (including volatile memory 215 and non-volatile memory 210). In some embodiments, the computer program product may be executed by the computing entity 200 and/or the client computing entity. For example, at least a first portion of the computer program product may be stored within the volatile memory 215 and/or non-volatile 210 of the computing entity 200. In addition, or alternatively, at least a second portion of the computer program product may be stored within the volatile and/or non-volatile memory of a client computing entity.

As indicated, in some embodiments, the computing entity 200 may also comprise one or more network interfaces 220 for communicating with various computing entities (e.g., the client computing entity 102, external computing entities), such as by communicating data, code, content, information, and/or similar terms used herein interchangeably that may be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. In some embodiments, the computing entity 200 communicates with another computing entity for uploading or downloading data or code (e.g., data or code that embodies or is otherwise associated with one or more machine learning models). Similarly, the computing entity 200 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, IEEE 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the computing entity 200 may additionally or alternatively comprise, or be in communication with, one or more input elements/devices, such as input sensor(s). In some examples, the input sensor(s) may comprise one or more keyboards, pointing devices (e.g., mouse, trackpad), touch screens, cameras (e.g., infrared light camera, visual light camera), depth sensors (e.g., LIDAR, radar, stereo cameras), gyroscopes, location sensors (e.g., global positioning system (GPS), Hall effect sensor, laser doppler vibrometer), microphones, and/or the like. The computing entity 200 may additionally or alternatively comprise, or be in communication with, one or more output elements/devices (not shown), such as one or more speakers, visual display devices, haptic feedback devices, motion devices (e.g., electromechanically actuated devices), and/or the like.

B. Example Client Computing Entity

Figure 3:
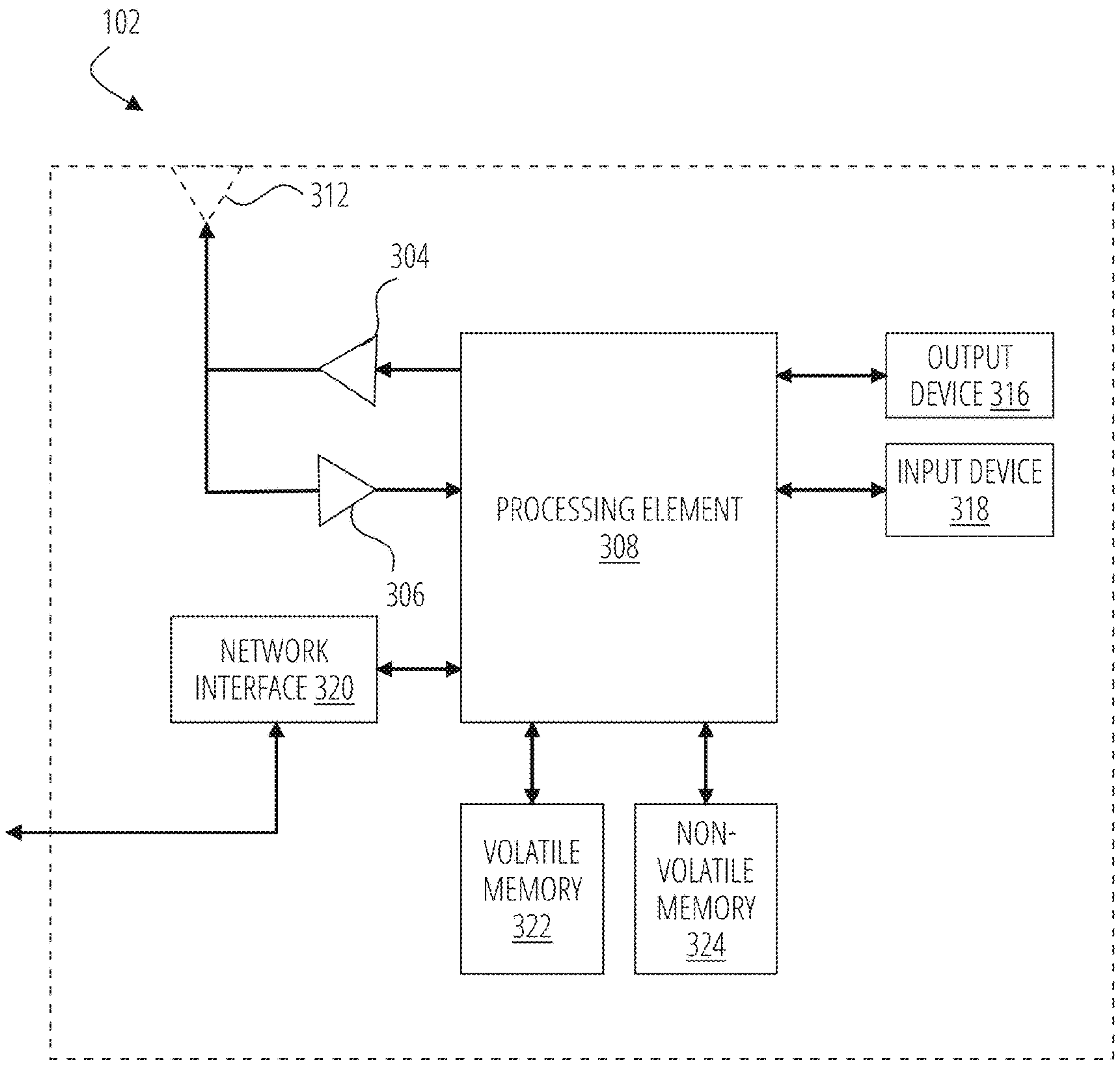
FIG. 3 depicts a block diagram of an example client computing entity in accordance with some embodiments of the present disclosure.

FIG. 3 depicts a block diagram of an example client computing entity in accordance with some embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Client computing entities 102 may be operated by various parties. As shown in FIG. 3, the client computing entity 102 may comprise an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may comprise signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with one or more wireless and/or wired communication standards and protocols, such as those described above with regard to the computing entity 200.

The client computing entity 102 may additionally or alternatively download code, changes, add-ons, and updates, for instance, to its firmware, software (e.g., including executable instructions, applications, program modules), and operating system.

According to some embodiments, the client computing entity 102 may comprise location determining aspects, devices, modules, functionalities, and/or similar words used herein interchangeably. For example, the client computing entity 102 may comprise outdoor positioning aspects, such as a location component adapted to acquire, for example, latitude, longitude, altitude, geocode, course, direction, heading, speed, universal time (UTC), date, and/or various other information/data. In some embodiments, the location component may acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data may be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data may be determined by triangulating the position of the client computing entity 102 in connection with a variety of other systems, including cellular towers, Wi-Fi access points, and/or the like. Similarly, the client computing entity 102 may comprise indoor positioning aspects, such as a location component adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops), and/or the like. For instance, such technologies may comprise the iBeacons, Gimbal proximity beacons, Bluetooth Low Energy (BLE) transmitters, NFC transmitters, and/or the like. These indoor positioning aspects may be used in a variety of settings to determine the location of someone or something to within inches or centimeters.

The client computing entity 102 may also comprise a user interface that may comprise an output device 316 coupled to a processing element 308 and/or a user input device 318 coupled to the processing element 308. An output device 316, for example, may comprise a hardware computing device comprising one or more output elements (not shown), such as one or more speakers, visual display devices, haptic feedback devices, motion devices (e.g., electromechanically actuated devices), and/or the like. A user input device 318 may comprise the same or different hardware computing device comprising one or more input elements (not shown), such as keyboards, pointing devices (e.g., mouse, trackpad), touch screens, cameras (e.g., infrared light camera, visual light camera), depth sensors (e.g., LIDAR, radar, stereo cameras), gyroscopes, location sensors (e.g., global positioning system (GPS), Hall effect sensor, laser doppler vibrometer), microphones, and/or the like.

In some examples, the user interface may additionally or alternatively comprise software component(s) executed by the processing element 308 to present (e.g., audibly, visually, tactilely) via a user input device 318 and/or output device 316 and/or a software endpoint such as an application programming interface (API) or exposed software function a graphical user interface (GUI) (e.g., at least a portion of a user application, browser), command-line interface, touch and/or haptic user interface, gesture and/or image capture-based interface, voice/audio user interface, and/or the like used herein interchangeably executing on and/or accessible via the client computing entity 102 to interact with and/or cause display of information/data from the computing entity 200, as described herein. In addition to providing input, the user input interface may be used, for example, to activate, deactivate, and/or modify certain functions, such as altering a power or operating state of the client computing entity 102, the computing system 101, the predictive computing entity 106, and/or the external computing entity 108.

The client computing entity 102 may further comprise, or be in communication with, one or more memory components, such as the volatile memory 322 and/or non-volatile memory 324. For example, the memory components may comprise non-transitory computer readable media, such as non-volatile memory 324 (also referred to as non-volatile storage, memory, memory storage, memory circuitry, and/or similar terms used herein interchangeably) and/or volatile memory 322 (also referred to as volatile storage, memory, memory storage, memory circuitry, and/or similar terms used herein interchangeably), as discussed above with reference to FIG. 2.

As will be recognized, the non-volatile memory 324 and/or the volatile memory 322 may store respective part(s) of one or more databases, database instances, database management systems, data, applications, programs, program modules, scripts, code (e.g., source code, object code, byte code, compiled code, interpreted code, machine code) that embodies one or more machine learning models or other computer functions described herein, executable instructions, and/or the like being executed by, for example, the processing element 308. The term database, database instance, database management system, and/or similar terms used herein interchangeably, may refer to a collection of records or data that is stored in a computer-readable storage medium using one or more database models; such as a hierarchical database model, network model, relational model, entity-relationship model, object model, document model, semantic model, graph model, and/or the like.

In another embodiment, the client computing entity 102 may comprise one or more components or functionalities that are the same or similar to those of the computing entity 200, as described in greater detail above. In one such embodiment, the client computing entity 102 downloads, e.g., via network interface 320, code embodying machine learning model(s) from the computing entity 200 so that the client computing entity 102 may run a local instance of the machine learning model(s). As will be recognized, these architectures and descriptions are provided for example purposes only and are not limited to the various embodiments.

In various embodiments, the client computing entity 102 may be embodied as an artificial intelligence (AI) computing entity (e.g., an intelligent agent machine-learned model), such as AutoGPT, Mycroft, Rhasspy, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage component, and/or accessible over a network. In various embodiments, the AI computing entity may be configured to retrieve and/or execute one or more of the predefined program algorithms upon the occurrence of a predefined trigger event.

III. EXAMPLE SYSTEM OPERATIONS

As indicated, various embodiments of the present disclosure make important technical contributions to message processing, filtering, and ingestion. In particular, systems and methods are disclosed herein that implement message filtering processing that may be integrated into messaging interfaces. By doing so, the message filtering processing of the present disclosure may provide improve messaging interfaces, such as the ETL interfaces of the present disclosure. This, in turn, may improve the functionality of a computer with respect to various computing tasks, including data ingestion, storage, messaging, and the like.

Figure 4:
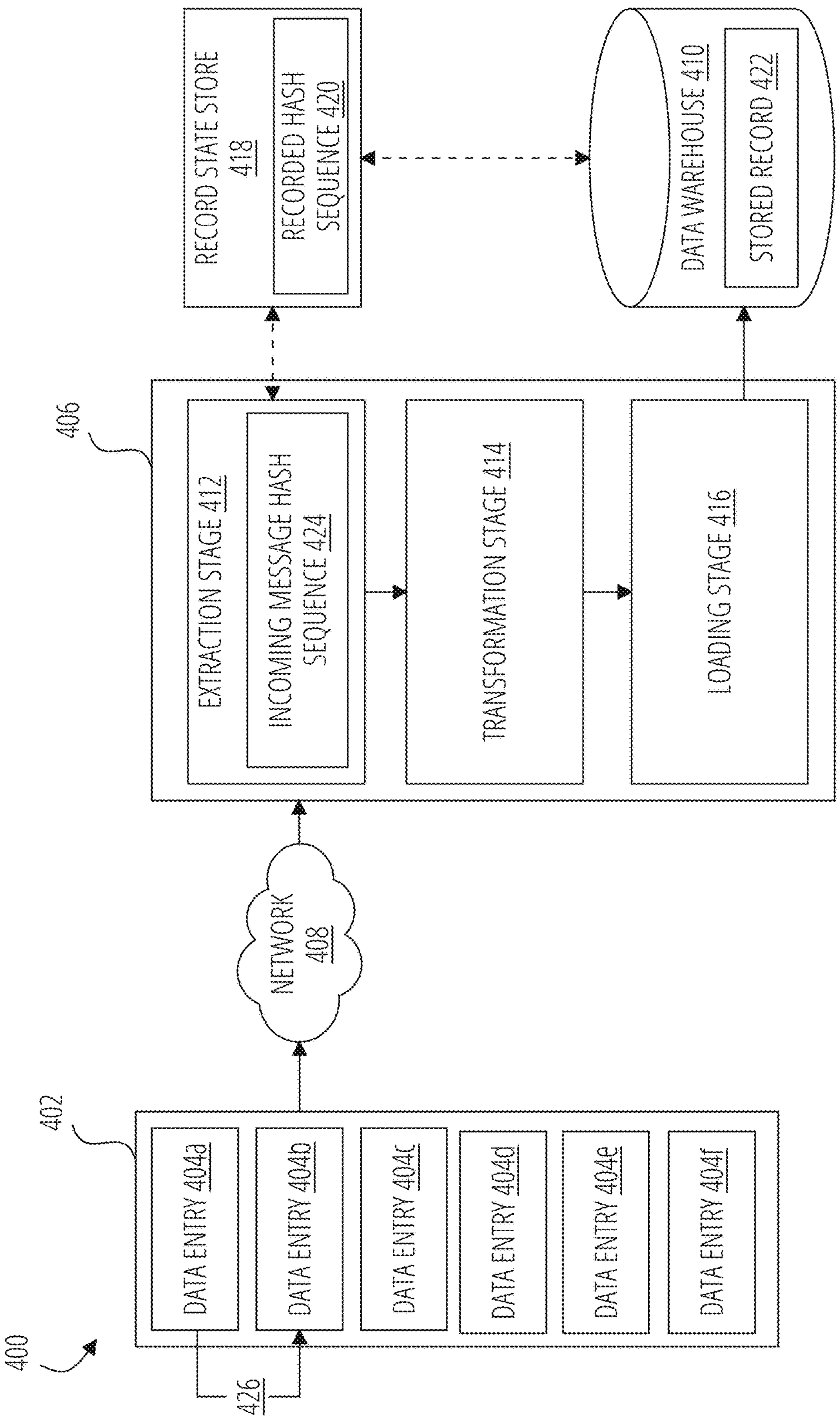
FIG. 4 depicts a dataflow diagram of an ETL interface in accordance with some embodiments of the present disclosure.

FIG. 4 depicts a dataflow diagram 400 of an ETL interface 406 of a computing system 101 in accordance with some embodiments of the present disclosure. As depicted, the ETL interface 406 implements a multi-stage ingestion process comprising an extraction stage 412, a transformation stage 414, and/or a loading stage 416. Through a series of operations, the multi-stage ingestion process may receive and process an incoming message 402 to update a corresponding stored record within a data warehouse 410. As described herein, the series of operations traditionally required to ingest an incoming message 402 is time intensive, which leads to processing backlogs and, in time sensitive applications, requires the use of increased computational power (e.g., a distributed load balancing computing environment) to process incoming messages 402 as they are received. Moreover, these technical challenges are directly proportional to the message size of an incoming message 402, such that larger message sizes may reduce the processing efficiency of the ETL interface 406. To reduce processing requirements and increase ingestion speeds for any message size without reducing the accuracy of message ingestion, the ETL interface 406 implements an expanded extraction stage 412 at which a portion of the incoming message 402 that corresponds to a change between the incoming message 402 and the stored record 422 is detected, using a hash-based matching technique, and then extracted for further processing. This allows the ETL interface 406 to discard an incoming message 402 before ingestion to a data warehouse 410, which reduces the processing expense of ingesting an incoming message 402 and is agnostic to message size. By doing so, the ETL interface 406 may improve the ingestion capacity of a computing system 101 by filtering incoming messages 402 before downstream stages of the multi-stage ingestion process.

In some embodiments, the computing system 101 receives, via a network 408 (e.g., a wired and/or wireless network), an incoming message 402. The computing system 101 may receive the incoming message 402 at the ETL interface 406, which may route the incoming message 402 to an extraction stage 412 for preprocessing before a transformation stage 414 and loading stage 416 of a multi-stage ingestion process.

In some embodiments, the ETL interface 406 is an extract, transform, and load service that receives and ingests incoming messages 402 for the computing system 101. The ETL interface 406 may comprise up to three distinct stages: (i) an extraction stage 412, (ii) a transformation stage 414, and/or (iii) a loading stage 416. Up to each of the stages may comprise an individual service (e.g., process) that is executed in parallel and sequentially with the other stages of the ETL interface 406. In some examples, the stages of the ETL interface 406 may individually process an incoming message 402, and/or portion thereof, to integrate the incoming message 402 into a data warehouse 410 and/or other storage system of the computing system 101. At the extraction stage 412, the ETL interface 406 may compare an incoming message 402 to an existing stored record 422 within a data warehouse 410. The comparison may be performed to detect and extract a portion of the incoming message 402 that corresponds to modifications within the stored record 422. By selectively extracting the modified portions, the ETL interface 406 may significantly reduce the amount of data that needs to be processed in subsequent stages of the ETL interface 406, thereby improving overall system efficiency.

Once the portion of the incoming message 402 is extracted, the ETL interface 406 passes the extracted portion to the transformation stage 414. At the transformation stage 414, the extracted data may be converted, cleaned, and/or otherwise manipulated to ensure it conforms to the target data model and/or schema of the data warehouse 410 and/or the stored record 422 therein. To do so, a transformation service may apply one or more data type conversion operations, formatting changes, sorting modifications, and/or the like that are preconfigured within the transformation service. In this way, by separating the transformation stage 414 from the extraction stage 412 and loading stage 416 of the ETL interface 406, specialized transformation rulesets may be uploaded, configured, and/or modified to track the schema of the data warehouse 410 without impacting the other services of the ETL interface 406.

Once transformed, the ETL interface 406 may pass the transformed portion of the incoming message 402 to the loading stage 416. At the loading stage 416, the transformed portion is loaded into the data warehouse 410 and/or other storage system. To do so, a loading service may identify an existing stored record 422 and/or insert a new stored record 422 for the incoming message 402. In the event that a stored record 422 already exists, the loading service may determine an update portion of the stored record 422 and replace the updated portion (e.g., via various database operations depending on the schema of the data warehouse 410), with the transformed portion of the incoming message 402.

By breaking down the process of ingesting incoming messages 402 into multiple stages, the ETL interface 406 provides a flexible and efficient mechanism for handling large volumes of data, which allows for optimized processing of cumulative data messages, addressing the technical challenges associated with repeated processing of largely unchanged data.

In some embodiments, the stored record 422 is a structured record that is stored within a data warehouse 410. The stored record 422 may comprise a record that is updatable by incoming messages 402 to track occurrences within the real world.

In some embodiments, the incoming message 402 is a data message for updating a stored record 422 and/or creating a new stored record 422. An incoming message 402 may receive from one or more different entities. The form (e.g., schema, type) may depend on a messaging protocol of the sender, such that the ETL interface 406 may be configured to identify and handle a set of different types of incoming messages 402. For instance, an incoming message 402 may comprise one of two fundamentally different message types, comprising (i) a cumulative message type that comprises an entire structured record that reproduces a corresponding stored record 422 with potentially one or more changes to the stored record 422, or (ii) an incremental message type that comprise a changed portion of a structured record corresponding to the stored record 422. In both cases, the incoming message 402 and/or the stored record 422 may comprise corresponding structured data records with one or more corresponding data entry 404*a-f* (a singular instance of which is referenced using data entry 404).

Cumulative messages, which comprise an entire structured record, present particular challenges in terms of processing efficiency for an ingestion process because these messages comprise large amounts of redundant data that is not changed by the incoming message 402. Thus, processing cumulative messages in their entirety may lead to heavy computational burdens, as the ETL interface 406 may be required to transform up to each data entry 404*a-f* of the incoming message 402 to compare up to each data entry 404*a-f* with the existing stored record 422. While computationally more efficient, incremental messages introduce their own set of challenges. For example, due to the lack context in an incremental message, the ETL interface 406 may be unable to accurately integrate the partial updates into the existing stored record 422. To address technical challenges with both cumulative and incremental messages, the ETL interface 406 of the present disclosure improves the processing speeds of cumulative message types to reduce a computing system 101 reliance of incremental message types.

In some embodiments, the stored record 422 and/or the incoming message 402 comprise one or more self-referencing data entries (e.g., the data entries 404*a-f*) that use entry references 426 to incorporate the attributes of and/or otherwise link the data entries to other data entries within the structured record. This approach allows for the creation of normalized, non-duplicated data by replacing duplicative data with references (e.g., pointers) to the data entry that includes the original data. The one or more self-referencing data entries of the stored record 422 and/or incoming message 402 may be used in any messaging domain. By way of example, in a healthcare domain, a stored record 422 may comprise a Fast Healthcare Interoperability Resources FHIR bundle and the incoming message 402 may comprise a FHIR bundle message. FHIR bundles are designed for data exchange between healthcare entities and provide a standardized format for representing complex healthcare data. The self-referencing nature of stored records 422 aligns well with the FHIR standard, which allows resources to reference each other, creating a web of interconnected data that accurately represents the relationships between different healthcare concepts. This enables the quick information transfer in a healthcare context that may be used in domain to improve messaging speeds, In some embodiments, a stored record 422 is implemented as a data structure within the data warehouse 410. The data structure may be realized in various forms, such as a graph data structure, a relational database table, an adjacency list, and/or a specialized data format designed for efficient storage and retrieval of self-referencing data. In some examples, a format of the stored record 422 may correspond to an incoming message format to enable quick comparisons between portions of the stored record 422 and a corresponding incoming message 402. By way of example, the stored record 422 and/or the incoming message 402 may define (e.g., via a graph representation, adjacency list, natural language text, linked list) a set of data entries as individual data objects in an object oriented data structure. In this manner, the data entries of a stored record 422 may be updated over time by replacing a data object within the stored record 422 with a corresponding data object of an incoming message 402.

In some embodiments, a data entry 404 is a unit or data object of an incoming message 402 and/or stored record 422. A data entry, for example, may comprise a building block of structured data structure. The data entry 404 may be implemented as an instance of a class or struct in object-oriented programming languages, as records in database systems, and/or the like. The specific implementation may vary depending on the programming language, database technology, or data serialization format being used.

In some examples, a data entry 404 may correspond to one of a set of object classes defined for a stored record 422 and/or incoming message 402. The data entry 404 may comprise one or more class-specific attributes, an entry identifier that is reflective of the object class, and/or one or more entry references to incorporate the attributes of associated data entries. For instance, a data entry 404 may be associated with a particular object class that defines the structure and/or behavior of the data entry 404. The object class may depend on the domain. By way of example, in a healthcare domain, an object classes may comprise a Patient class, an Encounter class, an Observation class, Medication class, and/or the like. The class-specific attributes of a data entry 404 may represent the various pieces of information associated with that particular object. For instance, continuing the healthcare domain example, a Patient data entry may comprise attributes, such as a name, a date of birth, a gender, and/or the like. To optimize memory usage and maintain data consistency, a data entry 404 may incorporate attributes of other object classes using entry references 426 that may act as pointers to associated data entries, allowing for the creation of complex, interconnected data structures without duplicating information.

In some embodiments, up to each data entry of a stored record 422 and/or incoming message 402 comprises an entry identifier that uniquely identifiers the data entry 404. An entry identifier, for example, may comprise a unique identifier (e.g., Universally Unique Identifier (UUID), hash value, or composite keys combining multiple attributes) for a data entry 404. By way of example, in a healthcare domain, an entry identifier may comprise a FHIR identifier. In some examples, a data entry 404 of a stored record 422 and/or an incoming message 402 may comprise corresponding entry identifiers that enable direct comparisons between the data entries. In addition, or alternatively, a data entry 404 of a stored record 422 and/or an incoming message 402 may comprise different entry identifiers. In such a case, the data entries may be matched based on a comparison of the attributes within each data entry.

In some embodiments, an entry attribute is a characteristic of the data entry 404. For instance, an entry attribute may comprise an individual piece of information that encapsulates one or more specific details relevant to the object and/or concept that the data entry represents. An entry attributes may be implemented as a property and/or field within a data structure and/or class. The entry attributes of a data entry 404 may comprise one or more different data types, such as a string for text-based information, date objects for dates, enumerated types for fixed sets of values, and/or the like. In some examples, the data type of a data entry 404 within an incoming message 402 may be modified, at the transformation stage 414 of the ETL interface 406, to transform the data entry 404 for loading within a stored record 422.

In some embodiments, an entry reference 426 is a reference to a second data entry 404*b* within a first data entry 404*a*. An entry reference, for example, may comprise an entry identifier for the second data entry 404*b* to reference the second data entry 404*b* within the first data entry 404*a*. By doing so, an entry reference 426 may identify a relationship between the first data entry 404*a* and the second data entry 404*b* allowing for the representation of complex, interconnected data structures. The entry reference 426, for example, may comprise a pointer, a foreign keys, a unique identifier, and/or the like that link one data entry to another. The specific implementation may vary depending on the data storage and/or management system. For example, in a relational database, an entry reference 426 may comprise a foreign key column that contains the primary key of another table. In an object-oriented system, the entry reference 426 may comprise an object reference and/or a unique identifier, such as the entry identifier, that may be used to look up a referenced object.

In some examples, upon reception of the incoming message 402, the ETL interface 406 may process the incoming message 402 to extract, at the extraction stage 412, a data entry of the incoming message 402 that corresponds to a modified data entry within a stored record 422. The ETL interface 406 may then discard the remaining data entries of the incoming message 402 and pass the extracted data entry to the transformation stage 414. As an example, the incoming message 402 may comprise a set of data entries 404*a-f* that comprise a first data entry 404*a*, a second data entry 404*b*, a third data entry 404*c*, a fourth data entry 404*d*, a fifth data entry 404*e*, and/or a sixth data entry 404*f*. At the extraction stage 412 of the ETL interface 406, the computing system 101 may extract one of the set of data entries 404*a-f* from the incoming message 402 that corresponds to a record modification for the stored record 422.

In some embodiments, the computing system 101 detects the one of the set of data entries 404*a-f* based on a hash comparison between an incoming message hash sequence 424 of the incoming message 402 and a recorded hash sequence 420 of the stored record 422. For example, as described in further detail with reference to FIG. 5, the computing system 101 may apply a hash-based matching technique to generate an incoming message hash sequence 424 for the incoming message 402 that may be directly (and/or indirectly) compared to a previously generated recorded hash sequence 420 for a corresponding stored record 422. In some examples, the recorded hash sequence 420 may be one of a set of recorded hash sequences that are stored within a record state store 418 cached (and/or otherwise stored) at the ETL interface 406. In this manner, the computing system 101 may perform a quick lookup to a condensed representation of a stored record 422 to detect modifications to the stored record 422 without access to the stored record 422 and/or the data warehouse 410. By way of example, the record state store 418 may be implemented as an in memory data structure, such as a hash table, to enable O(1) search operations and optionally indexed by a sender identifier and/or a member identifier. In some examples, the record state store 418 may comprise a set of recorded hash sequences 420 that respectively correspond to a set of stored records within the data warehouse 410. In this manner, the record state store 418 may act as an intermediary data structure within the ETL interface 406 that, with the hash-based matching techniques of the present disclosure, enable the targeted extraction of a data entries from the incoming message 402 before a transformation stage 414 and/or loading stage 416 of the ETL interface 406.

The ETL interface 406 may thereafter pass the extracted data entry to a transformation stage 414 of the ETL interface 406 to transform the extracted data entry (e.g., instead of the entire incoming message 402) into a schema of the data warehouse 410. The ETL interface 406 may then pass the transformed data entry (e.g., instead of the entire incoming message 402) to the loading stage 416 of the ETL interface 406 to load the transformed data entry to the data warehouse 410 by updating the stored record 422. The stored record 422, for example, may comprise a recorded data entry that corresponds to the transformed data entry. At the loading stage 416 of the ETL interface 406, the computing system 101 may load the transformed data entry to the data warehouse 410 by replacing the recorded data entry with the transformed data entry.

In some examples, the computing system 101 may store the transformed data entry of the incoming message 402 within the stored record 422 and regenerate the recorded hash sequence 420 for the stored record 422. The computing system 101, for example, may regenerate the recorded hash sequence 420 for a stored record 422 up to each time the stored record 422 is modified to provide an up-to-date hash representation of the stored record 422. The computing system 101 may push (e.g., store) the regenerated recorded hash sequence 420 (e.g., upon regeneration, at an update frequency) to/within the record state store 418 to update the hash representation of the stored record 422 for subsequent incoming messages 402.

In this manner, the ETL interface 406 may implement an improved ingestion process with an expanded extraction stage 412 capable of extracting targeted portions (e.g., data entries) of an incoming message 402 at an initial stage of an ingestion process. To do so, the ETL interface 406 leverages a hash-based matching mechanism that enables accurate and real time comparison between an incoming message 402 and a stored record 422 without access to the stored record 422. Traditionally, hash-based matching mechanisms are ineffective comparison tools when handling self-referencing data structures, such as the incoming message 402 and/or stored record 422, due to formatting inconsistencies that are introduced by entry references 426. To overcome these technical challenges, the extraction stage 412 of the ETL interface 406 may implement a new hash-based matching mechanism that integrates graph manipulation techniques with hashing algorithms to compensate for the formatting inconsistencies and/or other technical challenges introduced by self-referencing data structures. The hash-based matching techniques will now be described in further detail with reference to FIG. 5.

Figure 5:
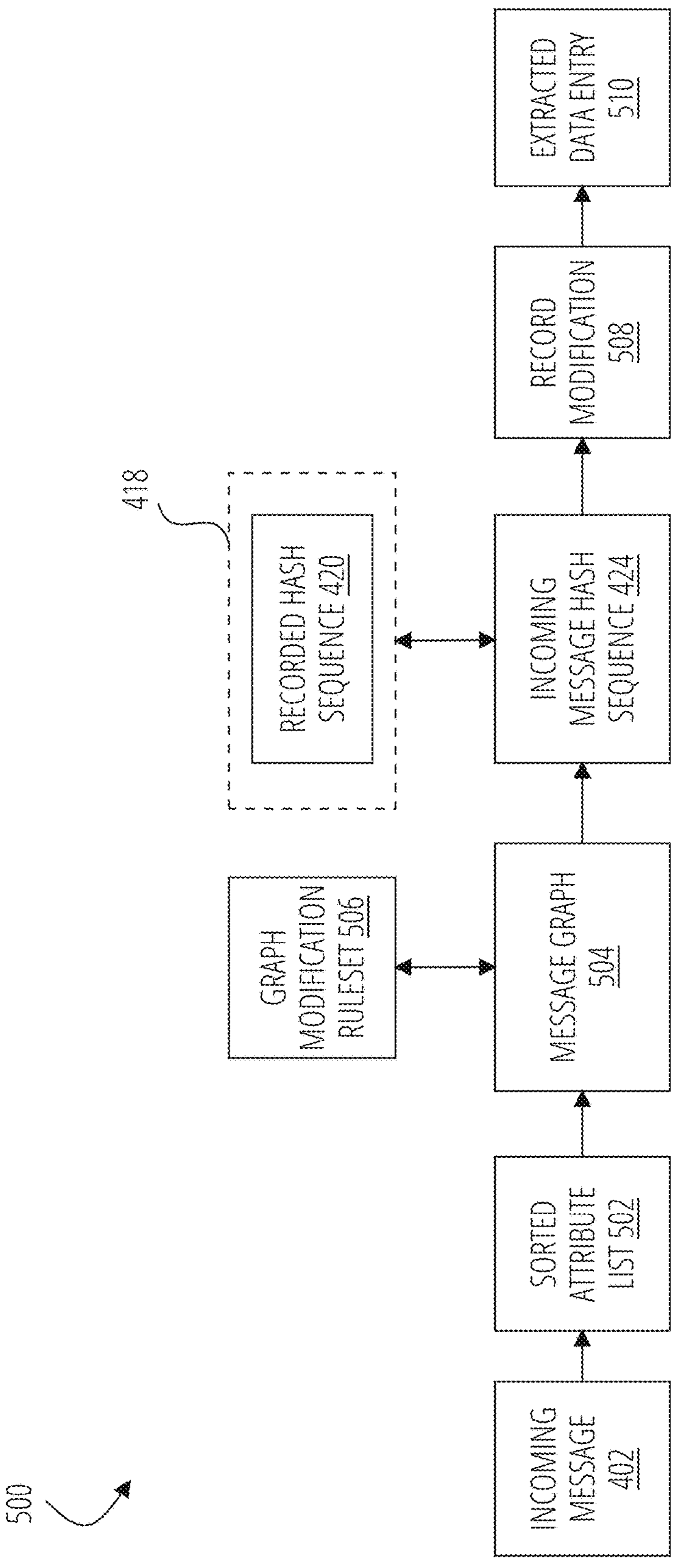
FIG. 5 is a dataflow diagram of a hash-based matching technique in accordance with some embodiments of the present disclosure.

FIG. 5 is a dataflow diagram 500 of a hash-based matching technique in accordance with some embodiments of the present disclosure. The hashed-based matching technique is tailored to self-referencing data structures, such as the incoming message 402 and/or stored record 422, to enable hash-based comparisons between data structures that are traditionally outside the score of hashing algorithms. To do so, the hashed-based matching technique comprises a series of operations (e.g., implemented by a computing system 101 at an extraction stage 412 of an ETL interface) that apply a set of rulesets to incrementally translate a self-referencing data structure to a reproducible hash representation. In this manner, the hashed-based matching techniques may be applied to an incoming message 402 to generate an incoming message hash sequence 424 that may be directly comparable to a previously generated recorded hash sequence 420 for a stored record and, in response to a record modification 508, the incoming message hash sequence 424 may replace the recorded hash sequence 420 for subsequent hash-based comparisons. This, in turn, enables real time retrieval and comparison operations that may be implemented within an ETL interface to improve the speed, efficiency, and accuracy of data ingestion technology.

In some embodiments, the computing system 101 receives an incoming message 402 that corresponds to a stored record. The incoming message 402 may comprise one or more data entries, such as a first data entry and a second data entry, and one or more entry references, such as a first entry reference within the second data entry that identifies the first data entry.

In some embodiments, the computing system 101 generates a sorted attribute list 502 for up to each data entry of the incoming message 402. For example, the computing system 101 may apply an attribute sorting ruleset to up to each data entry to arrange a set of entry attributes within the respective data entry in accordance with a predefined criteria. The attribute sorting ruleset, for example, may comprise a lexicographic ruleset, class-based ruleset, and/or any other predefined sorting criteria. As an example, the first data entry may comprise at least two first entry attributes. The computing system 101 may generate the sorted attribute list 502 by lexicographically sorting the at least two first entry attributes. This process may be repeated for up to each data entry within an incoming message 402 to arrange the entry attributes according to a predefined criteria. In some examples, each data entry may correspond to a data type, such as a JSON key and/or value. In such a case, the attribute sorting ruleset may sort up to each of a set of entry attributes by lexicographically sorting by key (e.g., firstname=zach would be sorted before lastname=bishop). In addition, or alternatively, up to each of the entry attributes may be modified to normalize the attributes by, for example, removing whitespace, and/or the like. Although depicted as a preprocessing step before the conversion of an incoming message 402 to a message graph 504, the computing system 101 may generate the sorted attribute list 502 at any time before the hashing operations of the present disclosure.

In some embodiments, the computing system 101 converts the incoming message 402 to a message graph 504. The message graph 504, for example, may comprise one or more nodes and edges that respectively correspond to one or more data entries and/or entry references of the incoming message 402. For instance, the computing system 101 may generate a node for up to each of a set of data entries within the incoming message 402. In addition, or alternatively, the computing system 101 may generate an edge for up to each of a set of entry references within the set of data entries of the incoming message 402. By way of example, a message graph 504 may comprise a first node corresponding to the first data entry of the incoming message 402, a second node corresponding to the second data entry, and/or a graph edge connecting the first node to the second node based on the first entry reference within the second data entry. In some examples, the computing system 101 converts the incoming message 402 to the message graph 504 by sorting up to each of the data entries according to an entry sorting ruleset (e.g., lexicographic sorting). The computing system 101 may walk the data entries in the sorted order (e.g., lexicographic order), add up to each data entry to the message graph 504 as a node (e.g., vertex), and, if the data entry comprises an entry reference, add the entry reference as an "edge" to a node corresponding to the referenced entry. In this way, the message graph may form an adjacency list that comprises sets of nodes in a sorted order (e.g., lexicographic order).

In some embodiments, the message graph 504 is a graph representation of an incoming message 402 (and/or stored record). A message graph 504, for example, may comprise a set of nodes that respectively correspond to a set of data entries within an incoming message 402 and/or a set of edges that respectively correspond to a set of entry references within the set of the data entries. In some examples, the computing system 101 may generate a message graph 504 by converting an incoming message 402 to an intermediate data structure, such as an adjacency list, adjacency lists, adjacency matrix, and/or the like, that models a sequence of relationships of the incoming message 402. The computing system 101 may convert the incoming message 402 and/or intermediate data structure to the message graph 504 by creating a node for up to each data entry of a set of data entries within the incoming message 402 and, for up to each data entry, assigning the entry attributes of the data entry to a corresponding node and iteratively generating an edge between the corresponding node and up to each of a set of associated nodes that respectively correspond to a set of entry references within the data entry. By way of example, the computing system 101 may generate a first node for the first data entry of the incoming message 402 by (i) lexicographically sorting the at least two first entry attributes to generate the sorted attribute list 502 and (ii) storing the sorted attribute list 502 within the first node. As another example, the computing system 101 may generate a second node for the second data entry of the incoming message 402 by (i) lexicographically sorting one or more second entry attributes of the second data entry to generate another sorted attribute list, (ii) storing the other sorted attribute list within the second node, and (iii) generating an edge from the second node to the first node based on the first entry reference.

The resulting graph structure allows for efficient traversal and analysis of the relationships between different data entries of the incoming message 402. A message graph 504 may comprise an undirected message graph and/or a directed message graph. As described herein, in either form, the message graph 504 may be leveraged (e.g., using graph traversal techniques) to detect changes between corresponding graph representations, validate and/or verify data integrity of the incoming message 402, among other data analysis techniques that may be performed as preprocessing operations within an ingestion process.

In some embodiments, a node of the message graph 504 comprises a vertex of a graph representation that corresponds to a data entry within an incoming message 402. A node, for example, may comprise an entry identifier for the corresponding data entry, a sorted attribute list 502 for a corresponding data entry, and/or one or more entry references to other data entries corresponding to different nodes within the message graph 504. In some embodiments, an edge of the message graph 504 comprises a pointer (and/or other relational link) that connects two nodes within the message graph 504. An edge, for example, may correspond to an entry reference within a data entry, such that a first entry reference within a second data entry may correspond to an edge from a second node corresponding to the second data entry to a first node corresponding to the first data entry. An edge may include an undirected graph edge and/or a directed graph edge depending on the type of message graph.

In some embodiments, the message graph 504 comprises a directed acyclic message graph that may be converted from an undirected message graph in accordance with a graph modification ruleset 506, which will be described in further detail with reference to FIGS. 6A-B. In addition, or alternatively, the message graph 504 may comprise an undirected message graph. By way of example, the message graph 504 may be converted to a directed acyclic message graph in response to a detection of graph cycle. In the absence of a graph cycle, the message graph 504 may remain an undirected message graph and/or be converted to a directed acyclic message graph.

In some embodiments, the computing system 101 generates, using a hashing algorithm, an incoming message hash for the incoming message 402 based on the message graph 504. For instance, the computing system 101 may generate an incoming message hash for up to each node of the message graph 504. In some examples, the resulting set of hashes may concatenated to generate an incoming message hash sequence 424 for the incoming message 402. By way of example, an incoming message hash may be one of a set of incoming message hashes of an incoming message hash sequence 424. The incoming message hash sequence 424 may comprise a first incoming message hash corresponding to a first node of the message graph, a second incoming message hash corresponding to the second node of the message hash, and/or the like. In some examples, the enable the reproducibility of the order of the sequence incoming message hash sequence 424, the computing system 101 may sort the message graph 504 using a graph sorting algorithms, such as a topological sort. Up to each node within the sorted message graph may then be hashed to form the sequence incoming message hash sequence 424. The sequence incoming message hash sequence 424, for example, may include a first incoming message hash corresponding to a lowest node of the message graph 504, a second incoming message hash corresponding to a second lowest node of the message graph 504, and/or the like. By way of example, after sorting the message graph 504, the computing system 101 may traverse the message graph 504 from the bottom up and recursively calculate hashes to generate incoming message hashes for up to each node (vertex) of the message graph.

In some embodiments, an incoming message hash sequence 424 is a sequence of hash values generated from a message graph 504. An incoming message hash sequence 424, for example, may comprise an ordered sequence of hash values that respectively correspond to up to each of a set of nodes within the message graph 504. In some examples, the order of the ordered sequence of hash values may be determined using a node sorting algorithms, such as lexicographically sorting based on entity identifies, and/or any other predefined sorting criteria. In this manner, an incoming message hash sequence 424 may provide a reproducible hash representation of a set of data entries within an incoming message 402.

In some examples, the computing system 101 may generate the incoming message hash sequence 424 by iteratively and individually applying a hashing algorithm to up to each node within the message graph 504 and concatenating the resulting incoming message hash to the incoming message hash sequence 424. In this way, the computing system 101 may ensure that up to each node's data is uniquely represented by a representative hash value. By doing so, the incoming message hash sequence 424 may facilitate efficient hash comparison between the incoming message hash sequence 424 and a previously generated recorded hash sequence 420 to detect data entry level modifications between an incoming message 402 and a stored record 422.

In some embodiments, an incoming message hash is a unit of an incoming message hash sequence 424 that comprises to a specific hash value for a node within the message graph 504. The incoming message hash may represent the data of a particular node within the message graph 504 by encapsulating one or more entry attributes stored within the node. For example, an incoming message hash may comprise a hash of a sorted attribute list 502 within a particular node. For instance, the computing system 101 may apply a hashing algorithm to the sorted attribute list 502 of a particular node to generate a particular incoming message hash. In some examples, the computing system 101 may modify the sorted attribute list 502 to remove an entry identifier and/or one or more entry references from the sorted attribute list 502 before applying the hashing algorithm. In this manner, the computing system 101 may replace an entry references within a sorted attribute list 502 with another hash value (e.g., another incoming message hash) that represents the node corresponding to the entry reference. For example, as described in further detail with reference to FIGS. 6A-B, the computing system 101 may replace a first entry reference within a second node with a first incoming message hash for a first node corresponding to the first data entry. The computing system 101 may generate a second incoming message hash for the second node by applying the hashing algorithm to the modified sorted attribute list 502 including one or more second entry attributes and the first incoming message hash. In this manner, the computing system 101 may applying a hash-based matching techniques that is reproducible and accounts for complex data relationships within self-referencing data structures.

In some embodiments, the hashing algorithm comprises any algorithm configured to generate a reproducible alphanumerical value from input data, such as a sorted attribute list 502 of a graph node. A hashing algorithm, for example, may comprise an MD5, SHA-256, SHA-3, and/or the like, that may be configured to take an input of arbitrary length and produce a fixed-size output, such as a string of characters and/or a numeric values. The output, for example, may comprise an incoming message hash for a particular sorted attribute list 502 that is designed to be unique for each distinct input. The hashing algorithm may be applied to up to each of the nodes within a message graph 504 by processing the sorted attribute lists within up to each of the nodes to generate a unique hash value. The resulting hash values may be concatenated to generate an incoming message hash sequence 424 that represents the incoming message 402.

In some embodiments, the computing system 101 detects a record modification 508 for the stored record based on a hash comparison between the incoming message hash and a recorded hash of the stored record. For example, the computing system 101 may detect the record modification 508 based on a mismatch between an incoming message hash and a corresponding recorded hash of the recorded hash sequence 420 that represents the stored record 422 within the record state store 418.

In some embodiments, a record modification 508 is a predicted change and/or discrepancy between a data entry in an incoming message 402 and corresponding data entry within a stored record. A record modification 508, for example, may indicate a potential difference in the attributes of an incoming data entry and a stored data entry, which may indicate an update, deletion, and/or anomalies that may be addressed by a data ingestion process to maintain data integrity and accuracy within a stored record. The computing system 101 may identify the record modification 508 through a comparison of hash values in an incoming message hash sequence 424 with those in a recorded hash sequence 420. By way of example, the computing system 101 may individually compare (e.g., using a string comparison tool) up to each of a set of incoming message hashes of the incoming message hash sequence 424 to a corresponding recorded hash of the recorded hash sequence 420 to detect one or more data entry level mismatches between the incoming message 402 and a corresponding stored record. In this manner, a hash-based matching technique may be applied to pinpoint specific changes to a stored record by a cumulative incoming message 402. The functionality of detecting record modifications allows the computing system 101 to extract portions of the incoming message 402 that correspond to changed portions of data, rather than redundantly processing entire datasets, thereby enhancing efficiency and reducing computational load.

In some embodiments, the computing system 101 maintains the referential integrity of the incoming message 402, while removing redundant portions, by generating a reconstructed message from the incoming message 402 that comprises the change data entry and up to each data entry that is referenced by the changed data entry. For example, the computing system 101 may detect a changed node within the message graph 504 that corresponds to a changed data entry. The computing system 101 may generate the reconstructed message based on the changed node by traversing the message graph 504 to detect one or more child nodes connected to the changed node. In some examples, the computing system 101 may add a child data entry corresponding to up to each of the one or more child nodes to generate the reconstructed message. In addition, or alternatively, the computing system 101 may remove the clone nodes (as described in further detail below) from the one or more child nodes and generate the reconstructed message using the remaining child nodes (with clone nodes removed).

In some embodiments, the computing system 101 stores a portion of the incoming message 402 (e.g., the data entries of the reconstructed message) that corresponds to the record modification 508 within a data warehouse, as described with reference to FIG. 4. In some examples, the computing system 101 may regenerate a recorded hash sequence 420 in response to a record modification 508. A recorded hash sequence 420, for example, may comprise a hash representation of a stored record. For instance, the recorded hash sequence 420 may comprise a set of recorded hashes that respectively correspond to a set of recorded data entries within the stored record. In this manner, the recorded hash sequence 420 may provide a compact and efficient representation of the entire stored record, enabling rapid comparison and change detection processes for incoming messages 402 as described herein. To enable up to data comparisons between incoming messages 402 and the stored record, the recorded hash sequence 420 may be replaced with an incoming message hash sequence 424 in response to a record modification.

In this manner, the hash-based matching technique of the present disclosure may leverage graph modeling techniques to enable hash comparisons between self-referencing data structures. In some examples that avoid graph cycles, such hash comparisons may be handled using an undirected message graph. However, in the event of graph cycles, incoming message hash sequences may disrupt the accuracy of the hash-based matching technique. To address these technical challenges, the hash-based matching technique may implement graph modification ruleset 506 to convert an undirected message graph to a directed acyclic message graph to improve the reproducibility of hash sequences for an incoming message 402 and corresponding stored record. An example graph modification ruleset 506 will now be described in further detail with reference to FIGS. 6A-B.

Figure 6A:
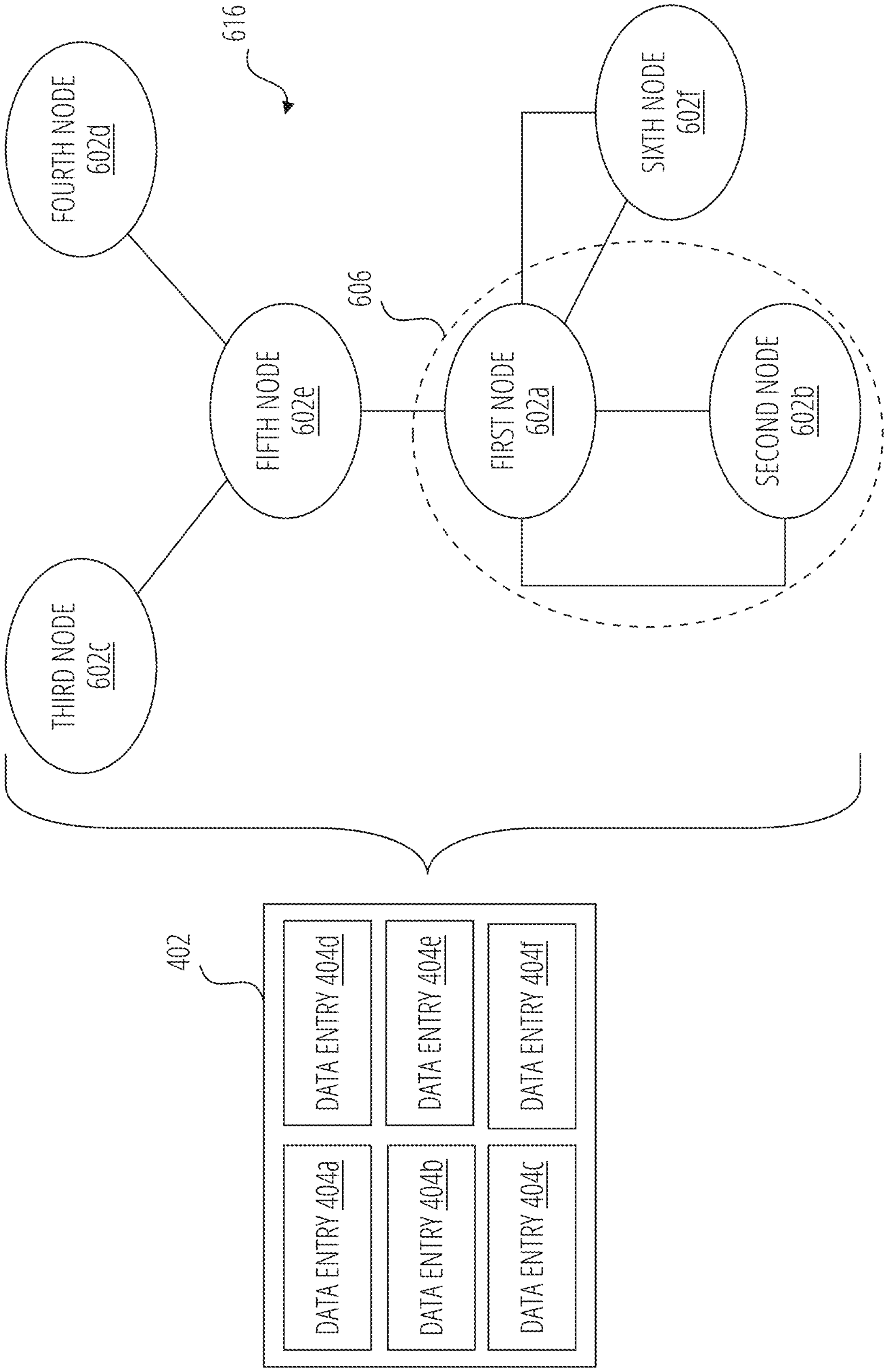
FIGS. 6A-B depict operational examples of a graph modification ruleset in accordance with some embodiments of the present disclosure.
Figure 6B:
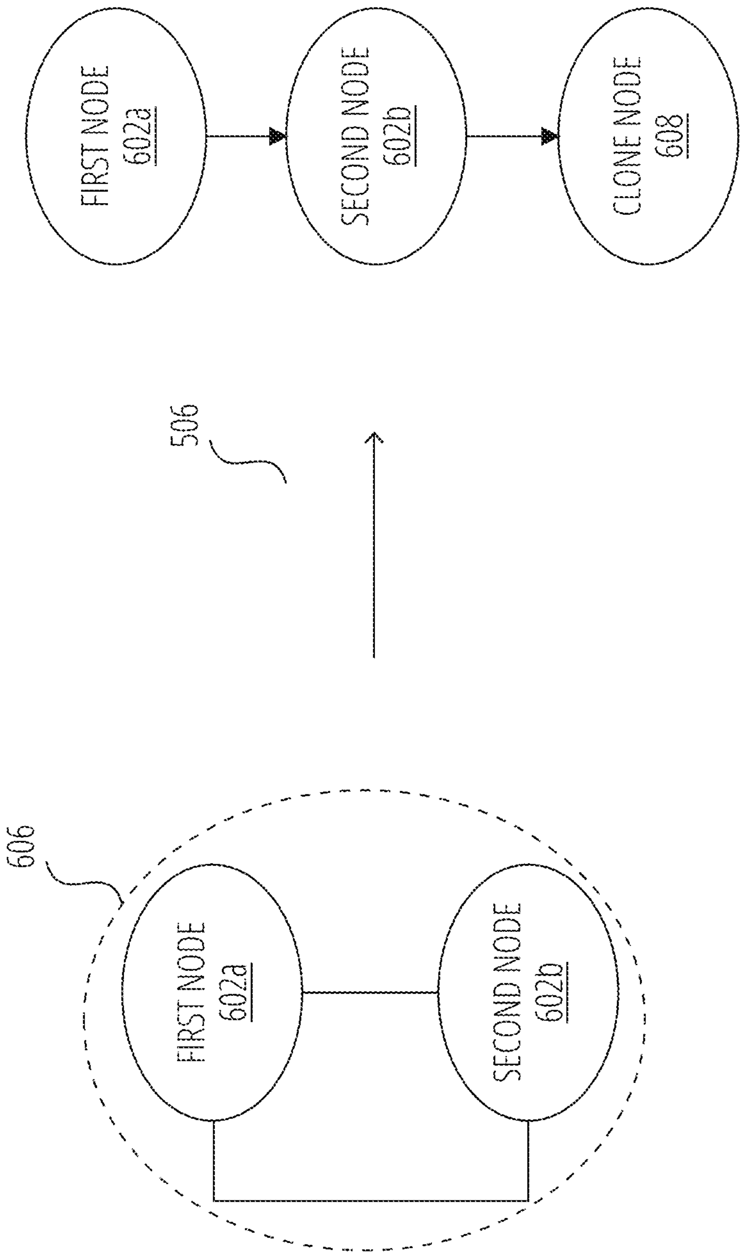

FIGS. 6A-B depict operational examples of a graph modification ruleset 506 in accordance with some embodiments of the present disclosure. The graph modification ruleset 506 is tailored to self-referencing data structures, such as the incoming message 402 and/or stored record, to enable reproducible hash sequences without information loss. To do so, the graph modification ruleset 506 may comprise a series of operations (e.g., implemented by a computing system 101 at an extraction stage 412 of an ETL interface) that covert an undirected message graph to a directed acyclic message graph that preserves the relationships of the undirected message graph while removing graph cycles that may hinder the reproducibility of the hash sequences derived from a message graph. To do so, the computing system 101 may detect a graph cycle 606, as shown in FIG. 6A, and in response to the detection of the graph cycle 606, break the graph cycle 606 to convert the undirected message graph 616 to a directed acyclic message graph as shown in FIG. 6B.

With reference to FIG. 6A, the computing system 101 may receive an incoming message 402 that comprises a set of data entries 404*a-f* that may comprise up to a first data entry 404*a*, a second data entry 404*b*, a third data entry 404*c*, a fourth data entry 404*d*, a fifth data entry 404*e*, and/or a sixth data entry 404*f*. One or more of the set of data entries 404*a-f* may comprise a data reference to another data entry within the set of data entries that may be mapped via a set of undirected graph edges of the undirected message graph 616. By way of example, the (i) first data entry 404*a* may comprise (a) a second entry reference, (b) a fifth entry reference, and/or (c) a sixth entry reference; the (ii) second data entry 404*b* may comprise a first entry reference; the (iii) third data entry 404*c* may comprise a first entry reference; the (iv) fourth data entry 404*d* may comprise a first entry reference; the (v) fifth data entry 404*e* may comprise zero entry references; and/or the (vi) sixth data entry 404*f* may comprise a first entry reference. Up to each of these entry references may be mapped to an edge of the undirected message graph 616 to connect a node comprising the entry reference to an associated node identified by the entry reference.

In some embodiments, the undirected message graph 616 is a first type of message graph with undirected graph edges that directly map to entry references within one or more data entries of the incoming message 402. An undirected message graph, for example, may comprise a set of undirected graph edges that directly map to up to each of the entry references within a set of data entries 404*a-f*. In this way, the undirected message graph 616 may model relationships between data entries that may be bidirectional and non-hierarchical in nature which allows for a flexible representation of data relationships. However, due to the one-to-one mapping, the undirected message graph 616 may form one or more graph cycles 606 in which at least two nodes both reference each other (e.g., there are two undirected edges between two nodes). For at least this reason, the graph modification ruleset 506 may leverage the undirected message graph 616 as an initial graph representation between data entries in an incoming message 402. The graph's undirected nature allows for the identification of cycles and/or complex interdependencies between nodes, which may serve as a basis for a subsequent, intermediate graph representation that breaks graph cycles 606 through node cloning and edge redirection to improve the reproducibility of downstream hash representations. By way of example, the computing system 101 may traverse (e.g., walk) the undirected message graph 616 to detect and/or break cycles by cloning one of the nodes within the cycle to create a "shallow copy" of the node without entry references.

In some embodiments, a graph cycle 606 is a portion of an undirected message graph 616 that comprises a sequence of edges that begin and end at a common node (e.g., first node 602*a* and/or second node 602*b* for the graph cycle 606). A graph cycle 606 may be formed by (i) two data entries that each reference one another, and/or (ii) a set of data entries that respectively comprise a set of entry references that reference a sequence of data entries comprising a duplicate data entry. The computing system 101 may detect a graph cycle 606 by traversing (e.g., using depth-first search (DFS) or other graph traversal techniques that can detect back edges indicating the presence of a cycle). the undirected message graph 616 and throwing a flag responsive to a duplicate node within a sequence of connected nodes. A graph cycle 606 may present several technical challenges in data processing by introducing serialization, scheduling, and/or processing dependencies that inhibit reproducibility hash sequences. The graph modification ruleset 506 may address these challenges by converting an undirected message graph 616 to a directed acyclic message graph that breaks graph cycles to produce a linear and non-repetitive graph representation, as shown in FIG. 6B.

With reference to FIG. 6B, the computing system 101 detects, using a graph traversal algorithm, the graph cycle 606 based on the two undirected graph edges that form a cycle between the first node 602*a* and the second node 602*b*. In response to the detection of the graph cycle 606, the computing system 101 may apply the graph modification ruleset 506 to remove the graph cycle 606 from the undirected message graph to generate a directed acyclic message graph. For example, the computing system 101 may generate a clone node 608 that corresponds to the first node 602*a*. For instance, the first data entry may generate a clone node 608 by assigning the first entry identifier, one or more first entry attributes, and/or a clone flag to the clone node 608 to generate a clone of the first node 602*a*. The computing system 101 may convert a first undirected graph edge of the two undirected graph edges to a first directed graph edge from the first node 602*a* to the second node 602*b*, remove the second undirected graph edge of the two undirected graph edges, and generate a second directed graph edge from the second node 602*b* to the clone node 608. In this manner, the graph cycle 606 may be converted to a linear, directed set of nodes that preserves the relationships of the graph cycle 606.

In some embodiments, the directed acyclic message graph comprises a second type of message graph with directed graph edges. The directed acyclic message graph, for example, may comprise a set of directed graph edges that are converted from the undirected edges of an undirected message graph by cloning nodes within a graph cycle 606 and redirecting the undirected edges to break the graph cycle 606. In this way, a directed acyclic message graph may improve the reproducibility of hash sequences in which cyclic dependency may otherwise lead to deadlocks or infinite loops. The directed acyclic message graph may enable efficient and error-free processing of data by ensuring that all dependencies are resolved in a unidirectional manner without cycles. To do so, the computing system 101 may identifying up to each of a set of graph cycles within an undirected message graph and break up to each of the set of graph cycles by cloning nodes and redirecting edges to enforce a hierarchical structure.

In some embodiments, a clone node 608 is a synthetic node generated to break graph cycles within an undirected message graph. A clone node, for example, may comprise a duplicate node of at least one node within a graph cycle 606. As depicted in FIG. 6B, the clone node 608 may be used to transform an undirected message graph into a directed acyclic message graph by providing an alternative path for edges that contribute to cycles, thereby breaking the cycle and maintaining the logical flow of the graph. A clone node 608 may be implemented by duplicating an original node's (e.g., first node 602*a*) data and/or inserting the clone node 608 into a graph with modified edges to eliminate the graph cycle 606. By way of example, the computing system 101 may generate a clone node 608 for the first node 602*a* by generating a new node and storing a set of first entry attributes of the first node 602*a* within the clone node 608. In addition, or alternatively, the computing system 101 may assign a clone flag to the clone node 608 to identify the clone node 608 as a clone of the first node 602*a*.

In some embodiments, the cloning node is determined from a set of nodes that form a graph cycle 606 using a defined sorting technique. For instance, the cloning node may be determined based on a lexicographic sorting of the set of nodes that form the graph cycle 606. By way of example, the computing system 101 may determine the first node 602*a* as the cloning node of the graph cycle 606 based on a lexicographic sorting of the first data entry and the second data entry. In this manner, a reproducible incoming message hash sequence may be generated for an incoming message by recursively stepping through a directed acyclic message graph in accordance with a recursive hashing technique described with reference to FIG. 7.

Figure 7:
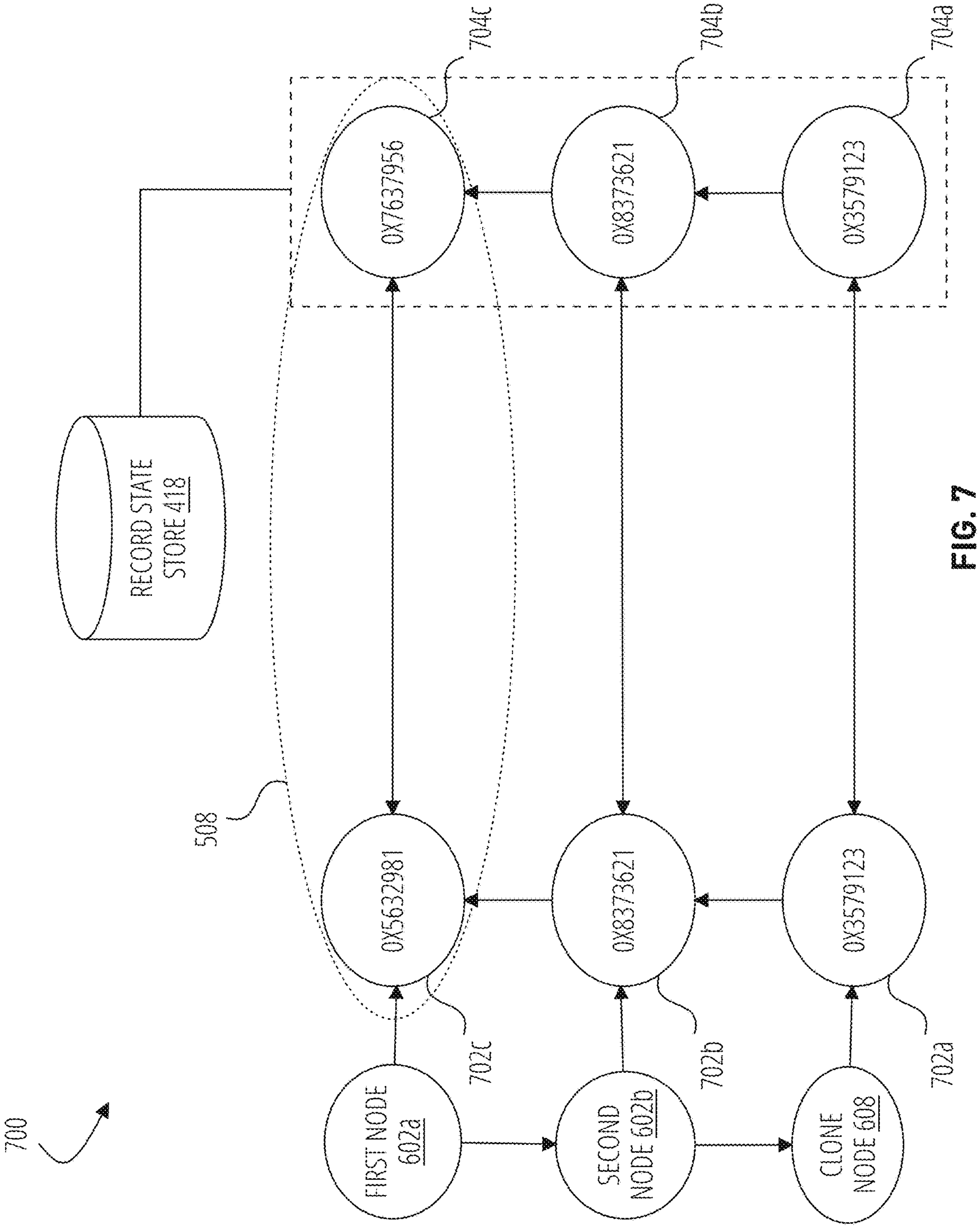
FIG. 7 is an operational example of a recursive hashing techniques in accordance with some embodiments of the present disclosure.

FIG. 7 is an operational example 700 of a recursive hashing techniques in accordance with some embodiments of the present disclosure. The recursive hashing technique is tailored to self-referencing data structures, such as the incoming message and/or stored record, to enable reproducible hashing sequences that retain relational data within the self-referencing data structures. The recursive hashing technique comprises a series of operations (e.g., implemented by a computing system 101 at an extraction stage 412 of an ETL interface) that recursively generate hashes from a message graph that incorporate hierarchical relationships within the message graph by replacing an entry reference at up to each node within the message graph with a hash values of a node referenced by the entry reference. In this manner, recursive hashing technique may enable reproducible hash sequences that allow for direct comparisons between an incoming message and stored record.

For example, as depicted in operational example 700, (i) an incoming message may be converted to an incoming message hash sequence 424 that comprises a first incoming message hash 702*a*, a second incoming message hash 702*b* that incorporates the first incoming message hash 702*a*, and a third incoming message hash 702*c* that incorporates the second incoming message hash 702*b* and (ii) a stored record may be represented in a record state store 418 by a previously generated recorded hash sequence comprising a first recorded hash 704*a*, a second recorded hash 704*b* that incorporates the first recorded hash 704*a*, and a third recorded hash 704*c* that incorporates the second recorded hash 704*b*. As depicted, using the recursive hashing techniques of the present disclosure, the first incoming message hash 702*a* and the first recorded hash 704*a* may comprise a matching hash value (e.g., 0X3579123) signifying a match between a data entry of the incoming message and the stored record without access to the stored record. In addition, or alternatively, the second incoming message hash 702*b* and the second recorded hash 704*b* may comprise a matching hash value (e.g., 0X837362) signifying a match between a data entry of the incoming message and the stored record without access to the stored record. In addition, or alternatively, the third incoming message hash 702*c* may comprise a different hash value (e.g., 0x5632981) than a third recorded hash 704*c* (e.g., 0x7637956) signifying a mismatch between a data entry of the incoming message and the stored record without access to the stored record. In such a case, the data entry corresponding to the third incoming message hash may be extracted from the incoming message for ingestion by an ETL interface to address a detected record modification 508.

With respect to the recursive hashing technique, computing system 101 may generate the incoming message hash sequence comprising the first incoming message hash 702*a*, the second incoming message hash 702*b*, and the third incoming message hash 702*c* by sequentially hashing the values of each of the nodes respectively corresponding to the first incoming message hash 702*a*, the second incoming message hash 702*b*, and the third incoming message hash 702*c*. By way of example, the first incoming message hash 702*a* may correspond to a first node 602*a*, the second incoming message hash 702*b* may correspond to a second node 602*b*, and the third incoming message hash 702*c* may correspond to a clone node 608 of the first node 602*a*.

The computing system 101 may generate the first incoming message hash 702*a* by removing the first entry identifier from the clone node 608 and applying the hashing algorithm to one or more of the remaining attributes of the clone node 608. The computing system 101 may generate the second incoming message hash 702*b* by removing the second entry identifier from the second node 602*b*, replacing a first entry reference within the second node 602*b* with the first incoming message hash 702*a*, and applying the hashing algorithm to the remaining attributes (e.g., including the first incoming hash 702*a*) of the second node 602*b*. The computing system 101 may generate the third incoming message hash 702*c* by removing the first entry identifier from the first node 602*a*, replacing the second entry reference within the first node 602*a* with the second incoming message hash 702*b*, and applying the hashing algorithm to the remaining attributes (e.g., including the second incoming hash 702*b*) of the first node 602*a*.

Figure 8:
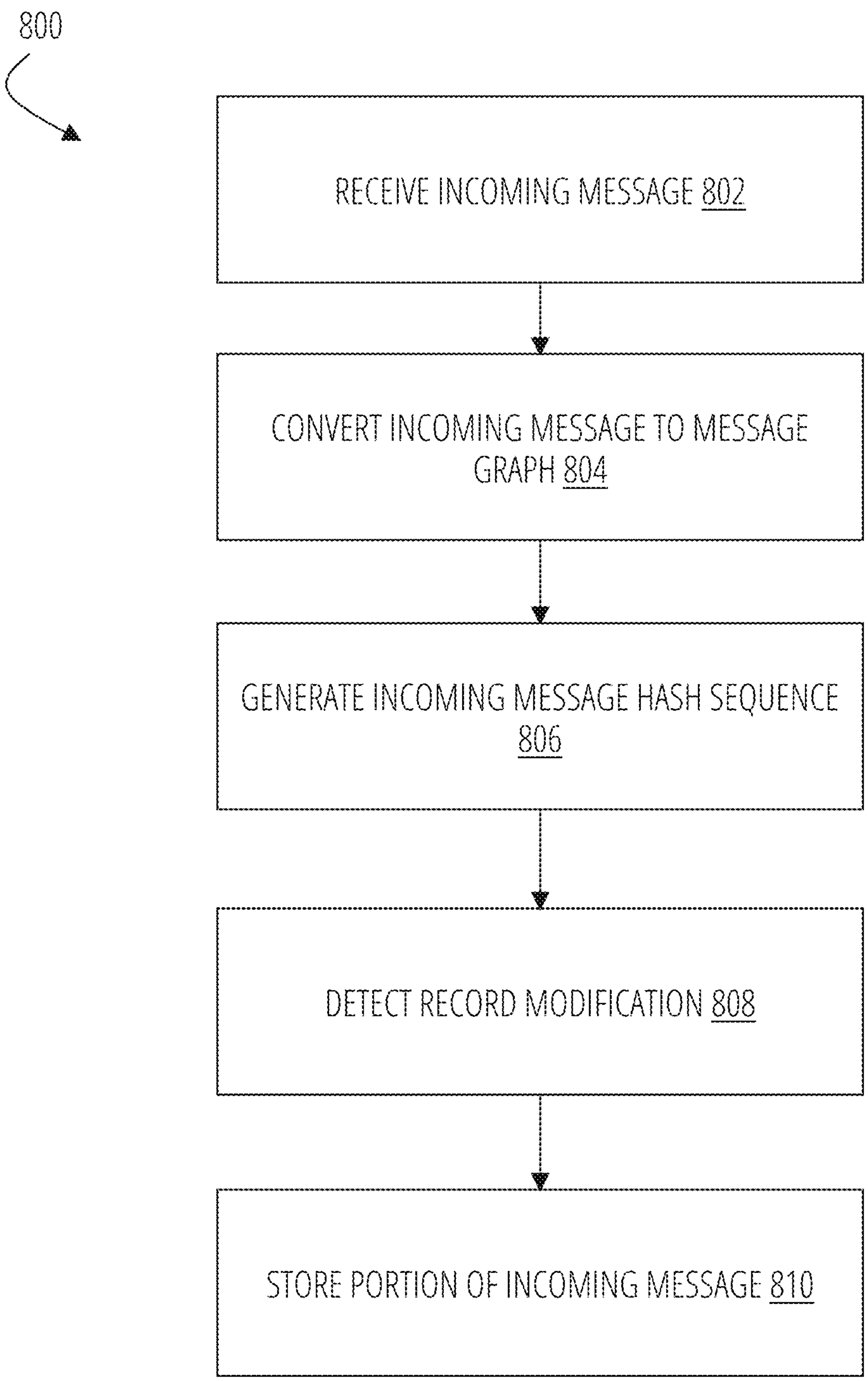
FIG. 8 is a flowchart diagram of an example message ingestion process in accordance with some embodiments of the present disclosure.

FIG. 8 is a flowchart diagram of an example message ingestion process 800 in accordance with some embodiments of the present disclosure. The flowchart diagram depicts a message ingestion technique for improving message ingestion of cumulative, self-referencing data structures in terms of speed, efficiency, and accuracy compared to traditional message ingestion technology. The process 800 may be implemented by one or more computing devices, entities, and/or systems described herein. For example, via the various steps/operations of the process 800, the computing system 101 may covert an incoming message to a comparable hash representation to detect targeted portions of the incoming message for downstream processing. By doing so, the process 800 improve computer functionality by improving ingestion efficiencies for self-referencing data structures by filtering redundant data from large file sizes before downstream ingestion operations of an ingestion service. This leads to significant improvements in ingestion speed, while reducing processing resource expenditures traditionally required for ingestion large data records.

FIG. 8 illustrates an example process 800 for explanatory purposes. Although the example process 800 depicts a particular sequence of steps/operations, the sequence may be altered without departing from the scope of the present disclosure. For example, some of the steps/operations depicted may be performed in parallel or in a different sequence that does not materially impact the function of the process 800. In other examples, different components of an example device or system that implements the process 800 may perform functions at substantially the same time or in a specific sequence.

In some embodiments, the process 800 comprises, at operation 802, receiving an incoming message. For example, the computing system 101 may receive an incoming message that corresponds to a stored record and comprises (i) a first data entry and (ii) a second data entry with a first entry reference that identifies the first data entry.

In some embodiments, the process 800 comprises, at operation 804, converting the incoming message to a message graph. For example, the computing system 101 may convert the incoming message to a message graph that comprises (i) a first node corresponding to the first data entry, (ii) a second node corresponding to the second data entry, and (iii) a graph edge connecting the first node to the second node based on the first entry reference. In some examples, the first data entry may comprise at least two first entry attributes and the computing system 101 may generate a first node by (i) lexicographically sorting the at least two first entry attributes to generate a sorted first attribute list and (ii) storing the sorted first attribute list within the first node.

In some embodiments, the process 800 comprises, at operation 806, generating an incoming message hash sequence. For example, the computing system 101 may generate, using a hashing algorithm, an incoming message hash for the incoming message based on one of the first node or the second node of the message graph. In some examples, the incoming message hash may be one of a set of incoming message hashes of an incoming message hash sequence that comprises a first incoming message hash corresponding to the first node, a second incoming message hash corresponding to the second node, and third incoming message hash corresponding to a third node (e.g., a clone node of a directed acyclic message graph as described with reference to FIG. 9).

In some examples, the computing system 101 may generate the third incoming hash corresponding to the third node (e.g., a clone node) by removing a first entry identifier from the third node (e.g., a clone of the first node), and applying the hashing algorithm to the third node (e.g., a clone node). In some examples, the second node may comprise a second entry identifier, a second entry attribute, and/or a first entry reference and the computing system 101 may generate the second incoming message hash corresponding to the second node by removing the second entry identifier from the second node, replacing the first entry reference within the second node with the third incoming message hash, and applying the hashing algorithm to the second node. In some examples, the first node may comprise a first entry identifier, a first entry attribute, and a second entry reference and the computing system 101 may generate the first incoming message hash corresponding to the first node by removing the first entry identifier from the first node, replacing the second entry reference within the first node with the second incoming message hash, and applying the hashing algorithm to the first node.

In some embodiments, the process 800 comprises, at operation 808, detecting a record modification. For example, the computing system 101 may detect a record modification for the stored record based on a hash comparison between the incoming message hash and a recorded hash of the stored record. For instance, (i) the incoming message hash may be one of a set of incoming message hashes of an incoming message hash sequence that comprises a first incoming message hash corresponding to the first node and a second incoming message hash corresponding to the second node and (ii) the recorded hash may be one of a set of recorded hashes of a recorded hash sequence that corresponds to the stored record and comprises a first recorded hash associated with the first data entry and a second recorded hash associated with the second data entry. The computing system 101 may detect the record modification for the stored record by determining (i) a first mismatch between the first incoming message hash and the first recorded hash and/or (ii) a second mismatch between the second incoming message hash and the second recorded hash.

In some embodiments, the process 800 comprises, at operation 810, storing a portion of the incoming message. For example, the computing system 101 may store a portion of the incoming message that corresponds to the record modification. In some examples, the portion of the incoming message is one of the first data entry and/or the second data entry. In some examples, the computing system 101 may store the portion of the incoming message within the stored record and regenerate a recorded hash sequence for the stored record.

In some examples, the incoming message may be received via an ETL interface. At an extraction stage of the ETL interface, the computing system 101 may extract one of the first data entry and/or the second data entry from the incoming message based on the incoming message hash and discarding the incoming message, At a transformation stage of the ETL interface, the computing system 101 may transform the one of the first data entry and/or the second data entry. And, at a loading stage of the ETL interface, the computing system 101 may load the one of the first data entry or the second data entry to a data warehouse that comprises the stored record. By way of example, the stored record may comprise a recorded data entry that corresponds to the one of the first data entry and/or the second data entry and loading the one of the first data entry and/or the second data entry to the data warehouse may comprise replacing the recorded data entry with the one of the first data entry and/or the second data entry.

Some techniques of the present disclosure enable the generation of action outputs that may be performed to initiate one or more real world actions to achieve real-world effects. The techniques of the present disclosure may be used, applied, and/or otherwise leveraged to ingest data to a data warehouse for maintaining real time records for any use case. In some examples, the real time records of the present disclosure may trigger action outputs (e.g., through control instructions) to automate various real world depending on the use case. The action outputs may control various aspects of a client device, such as the display, transmission, and/or the like of data reflective of an alert, and/or the like. The alert may be automatically communicated to a user and/or may be used to initiate a security protocol (e.g., locking a computer), a robotic action (e.g., performing an automated screening process), and/or the like.

In some examples, the computing tasks may comprise actions that may be based on a particular domain. A domain may comprise any environment in which computing systems may be applied to interpret, store, and process data and initiate the performance of computing tasks responsive to the data. These actions may cause real-world changes, for example, by controlling a hardware component, providing alerts, interactive actions, and/or the like. For instance, actions may comprise the initiation of automated instructions across and between devices, automated notifications, automated scheduling operations, automated precautionary actions, automated security actions, automated data processing actions, and/or the like.

Figure 9:
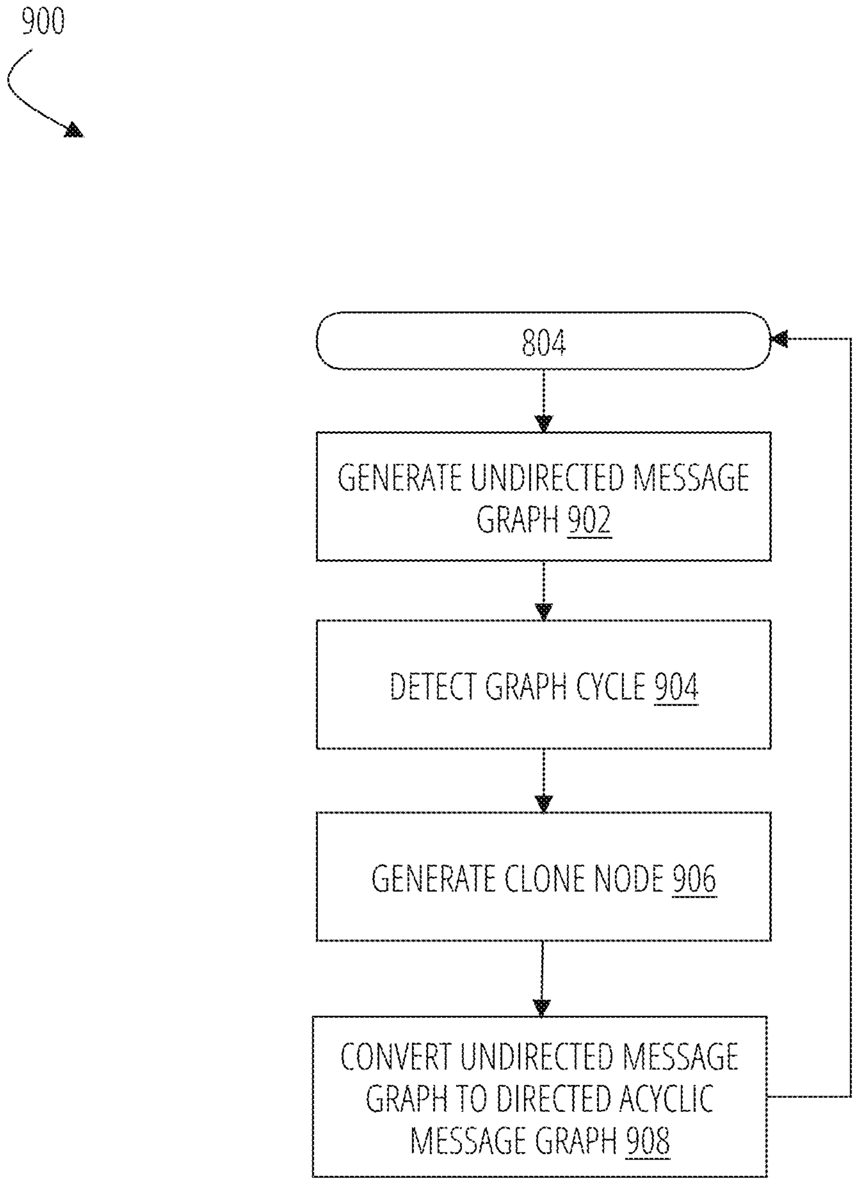
FIG. 9 is a flowchart diagram of an example graph conversion process in accordance with some embodiments of the present disclosure.

FIG. 9 is a flowchart diagram of an example graph conversion process 900 in accordance with some embodiments of the present disclosure. The flowchart diagram depicts a graph modification technique configured to convert an undirected message graph to a directed acyclic message graph that may be used as a basis for improved, reproducible hash sequences. The process 900 may be implemented by one or more computing devices, entities, and/or systems described herein. For example, via the various steps/operations of the process 900, the computing system 101 may convert an incoming message to a directed acyclic message graph to enable reproducible hash sequences from self-referencing data structures. By doing so, the process 900 improves computer functionality by enabling hash-based comparisons between self-referencing data structures traditionally outside the scope of hash algorithms. This, in turn, may be implemented within a message ingestion scheme to enable real time change detections within comprehensive data records. For example, the process 900 may comprise a set of operations within operation 804 of the process 800 in which the computing system 101 may convert an incoming message into a message graph.

FIG. 9 illustrates an example process 900 for explanatory purposes. Although the example process 900 depicts a particular sequence of steps/operations, the sequence may be altered without departing from the scope of the present disclosure. For example, some of the steps/operations depicted may be performed in parallel or in a different sequence that does not materially impact the function of the process 900. In other examples, different components of an example device or system that implements the process 900 may perform functions at substantially the same time or in a specific sequence.

In some embodiments, the process 900 comprises, at operation 902, generating an undirected message graph. For example, a first data entry may comprise a second data reference that identifies the second data entry and the computing system 101 may generate an undirected message graph by generating (i) a first node corresponding to the first data entry, (ii) a second node corresponding to the second data entry, and (iii) two undirected graph edges that each connect the first node to the second node.

In some embodiments, the process 900 comprises, at operation 904, detecting a graph cycle. For example, the computing system 101 may detect, using a graph traversal algorithm, a graph cycle based on the two undirected graph edges.

In some embodiments, the process 900 comprises, at operation 906, generate a clone node. For example, the computing system 101 may, in response to the detection of the graph cycle, generate a clone node that corresponds to the first node. In some examples, the first node may be determined as a cloning node of the graph cycle based on a lexicographic sorting of the first data entry and the second data entry. In some examples, the first data entry may comprise a first entry identifier, a first entry attribute, and/or the second entry reference and generating the clone node may comprise assigning the first entry identifier, the first entry attribute, and a clone flag to the clone node.

In some embodiments, the process 900 comprises, at operation 908, convert an undirected message graph to a directed acyclic message graph. For example, the computing system 101 may, in response to the detection of the graph cycle, convert a first undirected graph edge of the two undirected graph edges to a first directed graph edge from the first node to the second node, remove the second undirected graph edge of the two undirected graph edges, and generate a second directed graph edge from the second node to the clone node.

IV. CONCLUSION

Throughout this specification, components, operations, or structures described as a single instance may be implemented as multiple instances. Although individual operations of one or more methods (or processes, techniques, routines, etc.) are illustrated and described as separate operations, two or more of the individual operations may be performed concurrently or otherwise in parallel, and nothing requires that the operations be performed in the order illustrated. Structures and functionality (e.g., operations, steps, blocks) presented as separate components in example configurations may be implemented as a combined structure, functionality, or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, operations, blocks, or instructions. These may constitute and/or be implemented by software (e.g., code embodied on a non-transitory, machine-readable medium), hardware, or a combination thereof. In hardware, the routines, etc., may represent tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware component that operates to perform certain operations as described herein.

In various embodiments, a hardware component may be implemented mechanically or electronically. For example, a hardware component may comprise dedicated circuitry or logic that is permanently configured (e.g., as a special-purpose processor, such as a field programmable gate array (FPGA) or an application-specific integrated circuit (ASIC)) to perform certain operations. A hardware component may also or instead comprise programmable logic or circuitry (e.g., as encompassed within one or more general-purpose processors and/or other programmable processor(s)) that is temporarily configured by software to perform certain operations.

Accordingly, the term "hardware component" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where the hardware components comprise a general-purpose processor configured using software, the general-purpose processor may be configured as respective different hardware components at different times. Software may accordingly configure a processor, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple of such hardware components exist contemporaneously, communications may be achieved through signal transmission (e.g., over appropriate circuits and buses) that connect the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

As noted above, the various operations of example methods (or processes, techniques, routines, etc.) described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions. The components referred to herein may, in some example embodiments, comprise processor-implemented components.

Moreover, each operation of processes illustrated as logical flow graphs may represent a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions comprise routines, programs, objects, components, data structures, and the like that perform particular functions or implement particular data types. The order in which the operations are described is not intended to be construed as a limitation, and any number of the described operations can be combined in any order and/or in parallel to implement the processes.

The terms "coupled" and "connected," along with their derivatives, may be used. In particular embodiments, "connected" may be used to indicate that two or more elements are in direct physical or electrical contact with each other, although the context in the description may dictate otherwise when it is apparent that two or more elements are not in direct physical or electrical contact. "Coupled" may mean that two or more elements are in direct physical or electrical contact. However, "coupled" may also mean that two or more elements are not in direct contact with each other, yet still co-operate, transmit between, or interact with each other.

An algorithm may be considered to be a self-consistent sequence of acts or operations leading to a desired result. These comprise physical manipulations of physical quantities. Usually, though not necessarily, these quantities take the form of electrical, magnetic, or optical signals capable of being stored, transferred, combined, compared, and otherwise manipulated. These signals are commonly referred to as bits, values, elements, symbols, characters, terms, numbers, flags, or the like. It should be understood, however, that all of these and similar terms are to be associated with the appropriate physical quantities and are merely convenient labels applied to these quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments," "one embodiment," "an embodiment," "in some examples," or variations thereof means that a particular element, feature, structure, characteristic, operation, or the like described in connection with the embodiment is comprised in at least one embodiment, but not every embodiment necessarily comprises the particular element, feature, structure, characteristic, operation, or the like. Different instances of such a reference in various places in the specification do not necessarily all refer to the same embodiment, although they may in some cases. Moreover, different instances of such a reference may describe elements, features, structures, characteristics, operations, or the like be combined in any manner as an embodiment.

As used herein, the terms "comprises," "comprising," "comprises," "including," "has," "having" or any other variation thereof, are intended to cover a non-exclusive inclusion. For example, a process, method, article, or apparatus that comprises a list of elements is not necessarily limited to only those elements but may comprise other elements not expressly listed or inherent to such process, method, article, or apparatus. Further, unless the context of use clearly indicates otherwise, "or" refers to an inclusive or and not to an exclusive or. For example, a condition A or B is satisfied by any one of the following: A is true (or present) and B is false (or not present), A is false (or not present) and B is true (or present), and both A and B are true (or present).

The term "set" is intended to mean a collection of elements and can be a null set (i.e., a set containing zero elements) or may comprise one, two, or more elements. A "subset" is intended to mean a collection of elements that are all elements of a set, but that does not comprise other elements of the set. A first subset of a set may comprise zero, one, or more elements that are also elements of a second subset of the set. The first subset may be said to be a subset of the second subset if all the elements of the first subset are elements of the second subset, while also being a subset of the set. However, if all the elements of the second subset are also elements of the first subset (in addition to all the elements of the first subset being elements of the second subset), the first subset and the second subset are a single subset/not distinct.

For the purposes of the present disclosure, the term "a" or "an" entity refers to one or more of that entity. As such, the terms "a" or "an", "one or more", and "at least one" can be used interchangeably herein unless explicitly contradicted by the specification using the word "only one" or similar. For example, "a first element" may functionally be interpreted as "a first one or more elements" or a "first at least one element." Unless otherwise apparent from the context of use, reference in the present disclosure to a same set of "one or more processors" (or a same "plurality of processors," etc.) performing multiple operations can encompass implementations in which performance of the operations is divided among the processor(s) in any suitable way. For example, "generating, by one or more processors, X; and generating, by the one or more processors, Y" can encompass: (1) implementations in which a first subset of the processors (e.g., in a first computing device) generates X and an entirely distinct, second subset of the processors (e.g., in a different, second computing device) independently generates Y; (2) implementations in which one or more or all of the processor(s) (e.g., one or multiple processors in the same device, or multiple processors distributed among multiple devices) contribute to the generation of X and/or Y; and (3) other variations. This may similarly be applied to any other component or feature similarly recited (e.g., as "a component", "a feature", "one or more components", "one or more features", "a plurality of components", "a plurality of features"). Moreover, the performance of certain of the operations may be distributed among the one or more components, not only residing within a single machine, but deployed across a number of machines. The set of components may be located in a single geographic location (e.g., within a home environment, an office environment, a cloud environment). In other example embodiments, the set of components may be distributed across two or more geographic locations. Further, "a machine-learned model", equivalent terms (e.g., "machine learning model," "machine-learning model," "machine-learned component", "artificial intelligence", "artificial intelligence component"), or species thereof (e.g., "a large language model", "a neural network") may comprise a single machine-learned model or multiple machine-learned models, such as a pipeline comprising two or more machine-learned models arranged in series and/or parallel, an agentic framework of machine-learned models, or the like.

Upon reading this disclosure, those of skill in the art will appreciate still additional alternative structural and functional designs through the principles disclosed herein. Therefore, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The patent claims at the end of this patent application are not intended to be construed under 35 U.S.C. § 112(f) unless traditional means-plus-function language is expressly recited, such as "means for" or "step for" language being explicitly recited in the claim(s).

V. EXAMPLES

Some embodiments of the present disclosure may be implemented by one or more computing devices, entities, and/or systems described herein to perform one or more example operations, such as those outlined below. The examples are provided for explanatory purposes. Although the examples outline a particular sequence of steps/operations, each sequence may be altered without departing from the scope of the present disclosure. For example, some of the steps/operations may be performed in parallel or in a different sequence that does not materially impact the function of the various examples. In other examples, different components of an example device or system that implements a particular example may perform functions at substantially the same time or in a specific sequence.

Moreover, although the examples may outline a system or computing entity with respect to one or more steps/operations, each step/operation may be performed by any one or combination of computing devices, entities, and/or systems described herein. For example, a computing system may comprise a single computing entity that is configured to perform the steps/operations of a particular example. In addition, or alternatively, a computing system may comprise multiple dedicated computing entities that are respectively configured to perform one or more of the steps/operations of a particular example. By way of example, the multiple dedicated computing entities may coordinate to perform the steps/operations of a particular example.

Example 1. A computer-implemented method comprising receiving, by one or more processors, an incoming message that corresponds to a stored record and comprises (i) a first data entry and (ii) a second data entry with a first entry reference that identifies the first data entry; converting, by the one or more processors, the incoming message to a message graph that comprises (i) a first node corresponding to the first data entry, (ii) a second node corresponding to the second data entry, and (iii) a graph edge connecting the first node to the second node based on the first entry reference; generating, by the one or more processors and using a hashing algorithm, an incoming message hash for the incoming message based on one of the first node or the second node of the message graph; detecting, by the one or more processors, a record modification for the stored record based on a hash comparison between the incoming message hash and a recorded hash of the stored record; and storing, by the one or more processors, a portion of the incoming message that corresponds to the record modification.

Example 2. The computer-implemented method of example 1, wherein the incoming message is received, via an extract, transform, and load (ETL) interface, the portion of the incoming message is one of the first data entry or the second data entry, and storing the portion of the incoming message comprises at an extraction stage of the ETL interface, extracting the one of the first data entry or the second data entry from the incoming message based on the incoming message hash and discarding the incoming message; at a transformation stage of the ETL interface, transforming the one of the first data entry or the second data entry; and at a loading stage of the ETL interface, loading the one of the first data entry or the second data entry to a data warehouse that comprises the stored record.

Example 3. The computer-implemented method of example 2, wherein the stored record comprises a recorded data entry that corresponds to the one of the first data entry or the second data entry and loading the one of the first data entry or the second data entry to the data warehouse comprises replacing the recorded data entry with the one of the first data entry or the second data entry.

Example 4. The computer-implemented method of any of the preceding examples, wherein the first data entry comprises a second data reference that identifies the second data entry, the message graph comprises a directed acyclic message graph, and converting the incoming message to the message graph comprises generating an undirected message graph by generating (i) the first node corresponding to the first data entry, (ii) the second node corresponding to the second data entry, and (iii) two undirected graph edges that each connect the first node to the second node; and converting the undirected message graph to the directed acyclic message graph by (i) detecting, using a graph traversal algorithm, a graph cycle based on the two undirected graph edges; and (ii) in response to the detection of the graph cycle, (a) generating a clone node that corresponds to the first node, (b) converting a first undirected graph edge of the two undirected graph edges to a first directed graph edge from the first node to the second node, (c) removing a second undirected graph edge of the two undirected graph edges, and (d) generating a second directed graph edge from the second node to the clone node.

Example 5. The computer-implemented method of example 4, wherein the first node is determined as a cloning node of the graph cycle based on a lexicographic sorting of the first data entry and the second data entry.

Example 6. The computer-implemented method of any of examples 4 or 5, wherein the first data entry comprises a first entry identifier, a first entry attribute, and a second entry reference, and generating the clone node comprises assigning the first entry identifier, the first entry attribute, and a clone flag to the clone node.

Example 7. The computer-implemented method of example 6, wherein the incoming message hash is one of a set of incoming message hashes of an incoming message hash sequence that comprises a first incoming message hash corresponding to the first node, a second incoming message hash corresponding to the second node, and third incoming message hash corresponding to the clone node.

Example 8. The computer-implemented method of example 7, further comprising generating the third incoming message hash corresponding to the clone node by removing the first entry identifier from the clone node, and applying the hashing algorithm to the clone node.

Example 9. The computer-implemented method of example 8, wherein the second node comprises a second entry identifier, a second entry attribute, and the first entry reference and the computer-implemented method further comprises generating the second incoming message hash corresponding to the second node by removing the second entry identifier from the second node, replacing the first entry reference within the second node with the third incoming message hash, and applying the hashing algorithm to the second node.

Example 10. The computer-implemented method of example 9, wherein the first node comprises the first entry identifier, the first entry attribute, and the second entry reference and the computer-implemented method further comprises generating the first incoming message hash corresponding to the first node by removing the first entry identifier from the first node, replacing the second entry reference within the first node with the second incoming message hash, and applying the hashing algorithm to the first node.

Example 11. The computer-implemented method of any of the preceding examples, wherein (i) the incoming message hash is one of a set of incoming message hashes of an incoming message hash sequence that comprise a first incoming message hash corresponding to the first node and a second incoming message hash corresponding to the second node, (ii) the recorded hash is one of a set of recorded hashes of a recorded hash sequence that correspond to the stored record and comprise a first recorded hash associated with the first data entry and a second recorded hash associated with the second data entry, and (iii) detecting the record modification for the stored record comprises determining (i) a first mismatch between the first incoming message hash and the first recorded hash or (ii) a second mismatch between the second incoming message hash and the second recorded hash.

Example 12. The computer-implemented method of example 11, wherein storing the portion of the incoming message comprising storing the portion of the incoming message within the stored record; and regenerating the recorded hash sequence for the stored record.

Example 13. The computer-implemented method of any of the preceding examples, wherein the first data entry comprises at least two first entry attributes and generating the first node comprises (i) lexicographically sorting the at least two first entry attributes to generate a sorted first attribute list and (ii) storing the sorted first attribute list within the first node.

Example 14. A system comprising one or more processors; and one or more memories storing processor-executable instructions that, when executed by the one or more processors, cause the one or more processors to perform operations comprising receiving an incoming message that corresponds to stored record and comprises (i) a first data entry and (ii) a second data entry with a first entry reference that identifies the first data entry; converting the incoming message to a message graph that comprises (i) a first node corresponding to the first data entry, (ii) a second node corresponding to the second data entry, and (iii) a graph edge connecting the first node to the second node based on the first entry reference; generating, using a hashing algorithm, an incoming message hash for the incoming message based on one of the first node or the second node of the message graph; detecting a record modification for the stored record based on a hash comparison between the incoming message hash and a recorded hash of the stored record; and storing a portion of the incoming message that corresponds to the record modification.

Example 15. The system of example 14, wherein the first data entry comprises a second data reference that identifies the second data entry, the message graph comprises a directed acyclic message graph, and converting the incoming message to the message graph comprises generating an undirected message graph by generating (i) the first node corresponding to the first data entry, (ii) the second node corresponding to the second data entry, and (iii) two undirected graph edges that each connect the first node to the second node; and converting the undirected message graph to the directed acyclic message graph by (i) detecting, using a graph traversal algorithm, a graph cycle based on the two undirected graph edges; and (ii) in response to the detection of the graph cycle, (a) generating a clone node that corresponds to the first node, (b) converting a first undirected graph edge of the two undirected graph edges to a first directed graph edge from the first node to the second node, (c) removing a second undirected graph edge of the two undirected graph edges, and (d) generating a second directed graph edge from the second node to the clone node.

Example 16. The system of example 15, wherein the first node is determined as a cloning node of the graph cycle based on a lexicographic sorting of the first data entry and the second data entry.

Example 17. The system of any of examples 15 to 16, wherein the first data entry comprises a first entry identifier, a first entry attribute, and a second entry reference and generating the clone node comprises assigning the first entry identifier, the first entry attribute, and a clone flag to the clone node.

Example 18. One or more non-transitory computer-readable media storing processor-executable instructions that, when executed by one or more processors, cause the one or more processors to perform operations comprising receiving an incoming message that corresponds to stored record and comprises (i) a first data entry and (ii) a second data entry with a first entry reference that identifies the first data entry; converting the incoming message to a message graph that comprises (i) a first node corresponding to the first data entry, (ii) a second node corresponding to the second data entry, and (iii) a graph edge connecting the first node to the second node based on the first entry reference; generating, using a hashing algorithm, an incoming message hash for the incoming message based on one of the first node or the second node of the message graph; detecting a record modification for the stored record based on a hash comparison between the incoming message hash and a recorded hash of the stored record; and storing a portion of the incoming message that corresponds to the record modification.

Example 19. The one or more non-transitory computer-readable media of example 18, wherein the incoming message is received, via an extract, transform, and load (ETL) interface, the portion of the incoming message is one of the first data entry or the second data entry, and storing the portion of the incoming message comprises at an extraction stage of the ETL interface, extracting the one of the first data entry or the second data entry from the incoming message based on the incoming message hash and discarding the incoming message; at a transformation stage of the ETL interface, transforming the one of the first data entry or the second data entry; and at a loading stage of the ETL interface, loading the one of the first data entry or the second data entry to a data warehouse that comprises the stored record.

Example 20. The one or more non-transitory computer-readable media of example 19, wherein the stored record comprises a recorded data entry that corresponds to the one of the first data entry or the second data entry and loading the one of the first data entry or the second data entry to the data warehouse comprises replacing the recorded data entry with the one of the first data entry or the second data entry.

What is claimed is:

1. A computer-implemented method comprising:

receiving, by one or more processors, an incoming message that corresponds to a stored record and comprises (i) a first data entry and (ii) a second data entry with a first entry reference that identifies the first data entry;

converting, by the one or more processors, the incoming message to a message graph that comprises (i) a first node corresponding to the first data entry, (ii) a second node corresponding to the second data entry, and (iii) a directed graph edge connecting the first node to the second node based on the first entry reference, wherein the message graph comprises a directed acyclic message graph generated by detecting and breaking a graph cycle in the message graph;

generating, by the one or more processors and using a hashing algorithm, an incoming message hash for the incoming message based on one of the first node or the second node of the message graph;

detecting, by the one or more processors, a record modification for the stored record based on a hash comparison between the incoming message hash and a recorded hash of the stored record; and storing, by the one or more processors, a portion of the incoming message that corresponds to the record modification.

2. The computer-implemented method of claim 1, wherein the incoming message is received, via an extract, transform, and load (ETL) interface, the portion of the incoming message is one of the first data entry or the second data entry, and storing the portion of the incoming message comprises:

at an extraction stage of the ETL interface, extracting the one of the first data entry or the second data entry from the incoming message based on the incoming message hash and discarding the incoming message;

at a transformation stage of the ETL interface, transforming the one of the first data entry or the second data entry; and at a loading stage of the ETL interface, loading the one of the first data entry or the second data entry to a data warehouse that comprises the stored record.

3. The computer-implemented method of claim 2, wherein the stored record comprises a recorded data entry that corresponds to the one of the first data entry or the second data entry and loading the one of the first data entry or the second data entry to the data warehouse comprises replacing the recorded data entry with the one of the first data entry or the second data entry.

4. The computer-implemented method of claim 1, wherein the first data entry comprises a second entity reference that identifies the second data entry and converting the incoming message to the message graph comprises:

generating an undirected message graph by generating (i) the first node corresponding to the first data entry, (ii) the second node corresponding to the second data entry, and (iii) two undirected graph edges that each connect the first node to the second node; and converting the undirected message graph to the directed acyclic message graph by:

(i) detecting, using a graph traversal algorithm, the graph cycle based on the two undirected graph edges; and (ii) in response to detecting the graph cycle, (a) generating a clone node that corresponds to the first node, (b) converting a first undirected graph edge of the two undirected graph edges to a first directed graph edge from the first node to the second node, (c) removing a second undirected graph edge of the two undirected graph edges, and (d) generating a second directed graph edge from the second node to the clone node.

5. The computer-implemented method of claim 4, wherein the first node is determined as a cloning node of the graph cycle based on a lexicographic sorting of the first data entry and the second data entry.

6. The computer-implemented method of claim 4, wherein the first data entry comprises a first entry identifier, a first entry attribute, and the second entry reference, and generating the clone node comprises assigning the first entry identifier, the first entry attribute, and a clone flag to the clone node.

7. The computer-implemented method of claim 6, wherein the incoming message hash is one of a set of incoming message hashes of an incoming message hash sequence that comprises a first incoming message hash corresponding to the first node, a second incoming message hash corresponding to the second node, and a third incoming message hash corresponding to the clone node.

8. The computer-implemented method of claim 7, further comprising generating the third incoming message hash corresponding to the clone node by:

removing the first entry identifier from the clone node, and applying the hashing algorithm to the clone node.

9. The computer-implemented method of claim 8, wherein the second node comprises a second entry identifier, a second entry attribute, and the first entry reference and the computer-implemented method further comprises generating the second incoming message hash corresponding to the second node by:

removing the second entry identifier from the second node, replacing the first entry reference within the second node with the third incoming message hash, and applying the hashing algorithm to the second node.

10. The computer-implemented method of claim 9, wherein the first node comprises the first entry identifier, the first entry attribute, and the second entry reference and the computer-implemented method further comprises generating the first incoming message hash corresponding to the first node by:

removing the first entry identifier from the first node, replacing the second entry reference within the first node with the second incoming message hash, and applying the hashing algorithm to the first node.

11. The computer-implemented method of claim 1, wherein (i) the incoming message hash is one of a set of incoming message hashes of an incoming message hash sequence that comprise a first incoming message hash corresponding to the first node and a second incoming message hash corresponding to the second node, (ii) the recorded hash is one of a set of recorded hashes of a recorded hash sequence that correspond to the stored record and comprise a first recorded hash associated with the first data entry and a second recorded hash associated with the second data entry, and (iii) detecting the record modification for the stored record comprises determining (a) a first mismatch between the first incoming message hash and the first recorded hash or (b) a second mismatch between the second incoming message hash and the second recorded hash.

12. The computer-implemented method of claim 11, wherein storing the portion of the incoming message comprises:

storing the portion of the incoming message within the stored record; and regenerating the recorded hash sequence for the stored record.

13. The computer-implemented method of claim 1, wherein the first data entry comprises at least two first entry attributes and generating the first node comprises (i) lexicographically sorting the at least two first entry attributes to generate a sorted first attribute list and (ii) storing the sorted first attribute list within the first node.

14. A system comprising:

one or more processors; and one or more memories storing processor-executable instructions that, when executed by the one or more processors, cause the one or more processors to perform operations comprising:

receiving an incoming message that corresponds to a stored record and comprises (i) a first data entry and (ii) a second data entry with a first entry reference that identifies the first data entry;

converting the incoming message to a message graph that comprises (i) a first node corresponding to the first data entry, (ii) a second node corresponding to the second data entry, and (iii) a directed graph edge connecting the first node to the second node based on the first entry reference, wherein the message graph comprises a directed acyclic message graph generated by detecting and breaking a graph cycle in the message graph;

generating, using a hashing algorithm, an incoming message hash for the incoming message based on one of the first node or the second node of the message graph;

detecting a record modification for the stored record based on a hash comparison between the incoming message hash and a recorded hash of the stored record; and storing a portion of the incoming message that corresponds to the record modification.

15. The system of claim 14, wherein the first data entry comprises a second entity reference that identifies the second data entry, and converting the incoming message to the message graph comprises:

generating an undirected message graph by generating (i) the first node corresponding to the first data entry, (ii) the second node corresponding to the second data entry, and (iii) two undirected graph edges that each connect the first node to the second node; and converting the undirected message graph to the directed acyclic message graph by:

(i) detecting, using a graph traversal algorithm, the graph cycle based on the two undirected graph edges; and (ii) in response to detecting the graph cycle, (a) generating a clone node that corresponds to the first node, (b) converting a first undirected graph edge of the two undirected graph edges to a first directed graph edge from the first node to the second node, (c) removing a second undirected graph edge of the two undirected graph edges, and (d) generating a second directed graph edge from the second node to the clone node.

16. The system of claim 15, wherein the first node is determined as a cloning node of the graph cycle based on a lexicographic sorting of the first data entry and the second data entry.

17. The system of claim 15, wherein the first data entry comprises a first entry identifier, a first entry attribute, and the second entry reference and generating the clone node comprises assigning the first entry identifier, the first entry attribute, and a clone flag to the clone node.

18. One or more non-transitory computer-readable media storing processor-executable instructions that, when executed by one or more processors, cause the one or more processors to perform operations comprising:

receiving an incoming message that corresponds to a stored record and comprises (i) a first data entry and (ii) a second data entry with a first entry reference that identifies the first data entry;

converting the incoming message to a message graph that comprises (i) a first node corresponding to the first data entry, (ii) a second node corresponding to the second data entry, and (iii) a directed graph edge connecting the first node to the second node based on the first entry reference, wherein the message graph comprises a directed acyclic message graph generated by detecting and breaking a graph cycle in the message graph;

generating, using a hashing algorithm, an incoming message hash for the incoming message based on one of the first node or the second node of the message graph;

detecting a record modification for the stored record based on a hash comparison between the incoming message hash and a recorded hash of the stored record; and storing a portion of the incoming message that corresponds to the record modification.

19. The one or more non-transitory computer-readable media of claim 18, wherein the incoming message is received, via an extract, transform, and load (ETL) interface, the portion of the incoming message is one of the first data entry or the second data entry, and storing the portion of the incoming message comprises:

at an extraction stage of the ETL interface, extracting the one of the first data entry or the second data entry from the incoming message based on the incoming message hash and discarding the incoming message;

at a transformation stage of the ETL interface, transforming the one of the first data entry or the second data entry; and at a loading stage of the ETL interface, loading the one of the first data entry or the second data entry to a data warehouse that comprises the stored record.

20. The one or more non-transitory computer-readable media of claim 19, wherein the stored record comprises a recorded data entry that corresponds to the one of the first data entry or the second data entry and loading the one of the first data entry or the second data entry to the data warehouse comprises replacing the recorded data entry with the one of the first data entry or the second data entry.

* * * * *